United States Patent
Bauchspies

(10) Patent No.: US 10,157,306 B2
(45) Date of Patent: Dec. 18, 2018

(54) CURVE MATCHING AND PREQUALIFICATION

(71) Applicant: IDEX ASA, Fornebu (NO)

(72) Inventor: Roger A. Bauchspies, Gustine, CA (US)

(73) Assignee: IDEX ASA, Fornebu (NO)

(*) Notice: Subject to any disclaimer, the term of this patent is extended or adjusted under 35 U.S.C. 154(b) by 0 days.

(21) Appl. No.: 15/053,162

(22) Filed: Feb. 25, 2016

(65) Prior Publication Data

US 2016/0253543 A1 Sep. 1, 2016

Related U.S. Application Data

(60) Provisional application No. 62/126,140, filed on Feb. 27, 2015.

(51) Int. Cl.
*G06K 9/00* (2006.01)
*G06K 9/62* (2006.01)

(52) U.S. Cl.
CPC ........... *G06K 9/0008* (2013.01); *G06K 9/001* (2013.01); *G06K 9/00926* (2013.01); *G06K 9/6204* (2013.01)

(58) Field of Classification Search
CPC .... G06K 9/0008; G06K 9/6204; G06K 9/001; G06K 9/00926
USPC ............ 382/124, 125, 209; 73/592; 283/69; 340/5.83; 342/451
See application file for complete search history.

(56) References Cited

U.S. PATENT DOCUMENTS

| | | |
|---|---|---|
| 4,573,201 A | 2/1986 | Hashiyama et al. |
| 5,799,098 A | 8/1998 | Ort et al. |
| 5,828,773 A | 10/1998 | Setlak et al. |
| 5,845,005 A | 12/1998 | Setlak et al. |
| 5,852,670 A | 12/1998 | Setlak et al. |
| 5,909,501 A | 6/1999 | Thebaud |
| 5,926,555 A | 7/1999 | Ort et al. |
| 5,937,082 A | 8/1999 | Funada |

(Continued)

FOREIGN PATENT DOCUMENTS

| | | |
|---|---|---|
| EP | 1183638 A1 | 3/2002 |
| JP | 2007018168 A | 1/2007 |

(Continued)

OTHER PUBLICATIONS

Anil Jain et al., "Fingerprint Mosaicking" Proceedings of IEEE International Conference on Acoustics, Speech, and Signal Processing (ICASSP), Orlando, Florida, May 13-17, 2002.

(Continued)

*Primary Examiner* — John Strege
(74) *Attorney, Agent, or Firm* — Patent Law Offices of Michael E. Woods; Michael E. Woods

(57) ABSTRACT

A system, method, and computer program product for evaluating a conformance of sets of curves using curvature information from curve segments to identify conforming curve segments. These curve segments are evaluated for relative positional variations in a context of a cluster by triangulating corresponding points among the curve segments of the cluster. Little to no deviation between corresponding lengths in the clusters indicate a high probability of match. Confirmation may be done by a more rigorous pattern matcher based upon the conforming curve segments of a cluster.

22 Claims, 16 Drawing Sheets

(56) References Cited

U.S. PATENT DOCUMENTS

| | | | |
|---|---|---|---|
| 6,041,133 | A | 3/2000 | Califano et al. |
| 6,118,891 | A | 9/2000 | Funada |
| 6,233,348 | B1 | 5/2001 | Fujii et al. |
| 6,241,288 | B1* | 6/2001 | Bergenek ............ G06K 9/00087 283/67 |
| 6,285,789 | B1 | 9/2001 | Kim |
| 6,546,122 | B1 | 4/2003 | Russo |
| 6,795,569 | B1 | 9/2004 | Setlak |
| 6,836,554 | B1 | 12/2004 | Bolle et al. |
| 6,895,104 | B2 | 5/2005 | Wendt et al. |
| 6,941,003 | B2* | 9/2005 | Ziesig ............... G06K 9/00087 382/124 |
| 7,027,626 | B2 | 4/2006 | Funada |
| 7,142,699 | B2* | 11/2006 | Reisman ............ G06K 9/00087 382/124 |
| 7,203,347 | B2 | 4/2007 | Hamid |
| 7,236,617 | B1 | 6/2007 | Yau et al. |
| 7,330,571 | B2 | 2/2008 | Svensson et al. |
| 7,330,572 | B2 | 2/2008 | Uchida |
| 7,512,256 | B1 | 3/2009 | Bauchspies |
| 7,539,331 | B2 | 5/2009 | Wendt et al. |
| 7,574,022 | B2 | 8/2009 | Russo |
| 7,599,529 | B2 | 10/2009 | Fujii |
| 7,599,530 | B2 | 10/2009 | Boshra |
| 7,616,787 | B2 | 11/2009 | Boshra |
| 7,634,117 | B2 | 12/2009 | Cho |
| 7,643,660 | B1* | 1/2010 | Bauchspies ............ G06K 9/001 382/124 |
| 7,787,667 | B2 | 8/2010 | Boshra |
| 7,912,256 | B2 | 3/2011 | Russo |
| 7,970,186 | B2 | 6/2011 | Bauchspies |
| 8,055,027 | B2 | 11/2011 | Nikiforov |
| 8,295,561 | B2 | 10/2012 | Kwan |
| 8,514,131 | B2* | 8/2013 | Jovicic ................. G01S 5/0236 342/451 |
| 8,638,939 | B1 | 1/2014 | Casey et al. |
| 8,638,994 | B2 | 1/2014 | Kraemer et al. |
| 8,782,775 | B2 | 7/2014 | Fadell et al. |
| 8,908,934 | B2* | 12/2014 | Saito ................. G06K 9/00067 382/124 |
| 9,092,652 | B2 | 7/2015 | Marciniak et al. |
| 9,202,099 | B2 | 12/2015 | Han et al. |
| 2001/0016055 | A1* | 8/2001 | Harkless .............. G06K 9/0008 382/115 |
| 2007/0263912 | A1 | 11/2007 | Biarnes et al. |
| 2008/0013803 | A1 | 1/2008 | Lo et al. |
| 2009/0083847 | A1 | 3/2009 | Fadell et al. |
| 2014/0003681 | A1 | 1/2014 | Wright et al. |
| 2014/0056493 | A1 | 2/2014 | Gozzini |
| 2015/0135108 | A1 | 5/2015 | Pope et al. |
| 2015/0286855 | A1 | 10/2015 | Neskovic et al. |
| 2015/0294131 | A1 | 10/2015 | Neskovic et al. |
| 2016/0253543 | A1 | 9/2016 | Bauchspies |
| 2016/0253546 | A1 | 9/2016 | Bauchspies |

FOREIGN PATENT DOCUMENTS

| | | |
|---|---|---|
| WO | 02096181 A2 | 12/2002 |
| WO | PCT/IB2016/051081 | 2/2016 |
| WO | PCT/IB2016/051090 | 2/2016 |
| WO | 2016135696 A1 | 9/2016 |
| WO | 2016135704 A1 | 9/2016 |

OTHER PUBLICATIONS

Arica N et al: "BAS: a perceptual shape descriptor based on the beam angle statistics", Pattern Recognition Letters, Elsevier, Amsterdam, NL, vol. 24, No. 9-10, Jun. 1, 2003 (Jun. 1, 2003), pp. 1637-1649, XP004410701, ISSN: 0167-8655, DOI: 10.1016/S0167-8655(03)00002-3.

Arun Ross et al., "Image Versus Feature Mosaicing: A Case Study in Fingerprints" Proc. of SPIE Conference on Biometric Technology for Human Identification III, (Orlando, USA), pp. 620208-1-620208-12, Apr. 2006.

Cui J et al: "Improving Iris Recognition Accuracy via Cascaded Classifiers", IEEE Transactions on Systems, Man, and Cybernetics: Part C: Applications and Reviews, IEEE Service Center, Piscataway, NJ, US, vol. 35, No. 3, Aug. 1, 2005 (Aug. 1, 2005), pp. 435-441, XP011136735, ISSN: 1094-6977, DOI: 10.1109/TSMCC.2005. 848169.

International Search Report for International application No. PCT/IB2016/051081 dated Aug. 12, 2016.

International Search Report for International application No. PCT/IB2016/051090 dated Aug. 15, 2016.

Koichi Ito, et al., "A Fingerprint Matching Algorithm Using Phase-Only Correlation", IEICE Trans. Fundamentals, vol. E87-A, No. 3, Mar. 2004.

Koichi Ito, et al., "A Fingerprint Recognition Algorithm Combining Phase-Based Image Matching and Feature-Based Matching" D. Zhang and A.K. Jain (Eds.) ICB 2005, LNCS 3832, pp. 316-325, 2005 (C) Springer-Verlag Berlin, Heidelberg 2005.

Koichi Ito, et al., "A Fingerprint Recognition Algorithm Using Phase-Based Image Matching for Low-Quality Fingerprints" 0-7803-9134-9/05/$20.00 (C) 2005 IEEE.

Michael Donoser et al: "Efficient Partial Shape Matching of Outer Contours", Sep. 23, 2009 (Sep. 23, 2009), Lecture Notes in Computer Science, Springer, DE, pp. 281-292, XP019141346, ISBN: 978-3-642-12306-1.

Peng Li et al: "A Novel Fingerprint Matching Algorithm Using Ridge Curvature Feature", Jun. 2, 2009 (Jun. 2, 2009), Advances in Biometrics, Springer Berlin Heidelberg, Berlin, Heidelberg, pp. 607-616, XP019117974, ISBN: 978-3-642-01792-6.

Sandhya Tarar et al., "Fingerpring Mosaicking Algorithm to Improve the Performance of Fingerprint Matching System" Computer Science and Information Technology 2(3): 142-151, 2014.

Wang et al: "Fingerprint matching using OrientationCodes and Polylines", Pattern Recognition, Elsevier, GB, vol. 40, No. 11, Jul. 16, 2007 (Jul. 16, 2007), pp. 3164-3177, XP022155471, ISSN: 0031-3203, DOI: 10.1016/J.PATCOG.2007.02.020.

Written Opinion of the International Searching Authority for PCT/IB2016/051090 dated Aug. 15, 2016.

Written Opinon of the International Searcahing Authority for International application No. PCT/IB2016/051081.

Xuyi Ng Zhao et al: "A Novel Two stage Cascading Algorithm for Fingerprint Recognition", Proceedings of the 2nd International Symposium on Computer, Communication, Control and Automation, Dec. 1, 2013 (Dec. 1, 2013), XP055276297, Paris, France DOI: 10.2991/3ca-13.2013.76 ISBN: 978-1-62993-977-3.

Xuying Zhao et al: "A Novel Two Stage Cascading Algorithm for Fingerprint Recognition", Proceedings of the 2nd International Symposium on Computer, Communication, Control and Automation, Dec. 1, 2013 (Dec. 1, 2013), XP044276297, Paris, France DOI: 10.2991/3ca-13.2013.76)—ISBN 978-1-62993-977-3.

Y.S. Moon et al., "Template Synthesis and Image Mosaicking for Fingerprint Registration: An Experimental Study" 0-7803-8484-9/04/$20.00 (C) 2004 IEEE.

U.S. Appl. No. 62/126,140, filed Feb. 27, 2015, Roger A. Bauchspies.

U.S. Appl. No. 14/689,821, filed Apr. 17, 2015, Roger A. Bauchspies.

* cited by examiner

CURVE MATCHING AND PREQUALIFICATION

CROSS REFERENCE TO RELATED APPLICATIONS

This application claims benefit of U.S. Patent Application No. 62/126,140 filed 27 Feb. 2015, the contents of which are hereby expressly incorporated by reference thereto for all purposes.

FIELD OF THE INVENTION

The present invention relates generally to automatic machine-implemented pattern verification and other types of pattern comparisons and processings, and more specifically, but not exclusively, to systems, methods, and computer program products for curve segment contour matching.

BACKGROUND OF THE INVENTION

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

U.S. Pat. No. 7,970,186 and U.S. Pat. No. 7,643,660, "System, method and computer program product for fingerprint verification," are hereby expressly incorporated by reference in their entireties for all purposes. The '186 patent and the '660 patent describe fingerprint verification and include references to various fingerprint verification processes that may be referenced to points of interest. In some fingerprint verification systems, there are a particular class of features that are referred to as minutia. In some cases, minutia may be used as image anchors used in methods to compare a test image against one or more reference images for possible correspondence.

Minutia are generally present in an image of a whole fingerprint. As an image capture area size decreases to visualize less than a whole fingerprint, minutia are less prevalent. In certain cases minutia may be absent from any given image of a partial fingerprint.

Any fingerprint processing that relies on minutia may be inoperative or have reduced effectiveness when processing partial fingerprint images.

Increasingly there is a desire to enable use of fingerprint sensors that have a reduced imaging area as compared to whole finger sensors. Eliminating or reducing any requirement for minutia processing allows use and adoption of a wider range of sensor sizes.

BRIEF SUMMARY OF THE INVENTION

Disclosed is a system, method, and computer program product for decreasing or eliminating any requirement for minutia during pattern verification, specifically during fingerprint verification. The following summary of the invention is provided to facilitate an understanding of some of the technical features related to pattern verification, and is not intended to be a full description of the present invention. A full appreciation of the various aspects of the invention can be gained by taking the entire specification, claims, drawings, and abstract as a whole. The present invention is applicable to other pattern processing systems and verification systems in addition to fingerprint patterns and fingerprint verification systems. Further, the present invention is not constrained to pattern representations that are images of pattern sources but may be applied to various machine-processable/readable representations of a pattern source including bitmaps, data structures derived from images or sensor output, including combinations of pattern information from various sources.

Some embodiments of the present invention relate to automatic machine-implemented curve segment comparison in which a first set of curves are compared to a second set of curves. The first set of curves may be representative of a first pattern source or template and the second set of curves may be from an unknown pattern source or template. It being desired to establish, within some level of confidence, whether the unknown pattern source is the same or sufficiently close as the first pattern source.

Depending upon the level of confidence desired in a particular context, some embodiments of the present invention may directly verify whether the unknown pattern source matches the first pattern source.

Some embodiments of the present invention may pre-screen or pre-qualify the second set of curves for other subsequent automated processing that more rigorously analyze the sets of curves. This pre-screening or pre-qualification may also identify one or more features from the second set of curves that could be used in the subsequent automated processing. Some embodiments may identify sets or combinations of features or calculated/measured relationships between and among elements of a pattern representations. Such features and/or relationships may be used as pattern signatures, quality parameters, clusters, and/or as alternatives to "minutiae" that may be used by subsequent processes or analyses.

In some embodiments of the present invention, the pattern sources are human fingers and the sets of curves represent fingerprint data (e.g., curve segments defining all or part of ridge segments). In this context, a first pattern source may represent a registered finger of an authorized user (e.g., an index finger of the right hand of the user). When used with a sensor that captures less than an entire fingerprint image, there may be many different valid sets of curves all from the same registered finger of the authorized user. These valid sets of curves may represent different areas of the same fingerprint, including some with translational and/or rotational variation. At some point, a verification process may receive an unknown set of curves from an unknown pattern set (e.g., a portion of a fingerprint from an unknown user). It being desired to ascertain whether the unknown user is the same, within a desired level of confidence, as the authorized user, such as based upon a correspondence between elements of the portion of the fingerprint from the unknown user and elements of the registered information for the authorized user.

Some of the disclosed embodiments of the present invention may be used to directly evaluate an unknown set of curves against the registered data for a "final" verification. Other implementations may use one or more results as a pre-screening or prequalification of one or more curve segments of interest for a more intensive verification process. The pre-screening may include identification of one or more curve segments or points of interest along the identified curve segments for the more intensive automated fingerprint verification process. These embodiments do not use, and are not required to use, minutia from the fingerprint images.

At a simple level, an evaluation method of the present invention compares the unknown set of curves against an authorized set of curves. In each set of curves, all curve segments are identified, with each curve segment extending from a curve segment start to a curve segment end. A nested method comparison is used to compare each curve segment of one set of curves against all the curve segments of the other set of curves. Each comparison establishes a figure of merit for the conformation of the compared curve segments. Curve segments are matched in decreasing order of conformation based on the associated figures of merit for the comparison. Some embodiments may not compare every curve segment of one set against every curve segment of another set.

A machine-implemented pattern testing method comparing a first digital representation of a first pattern against a second digital representation of a second pattern to establish a measure of correspondence between the first pattern and the second pattern, including mapping a first set of characteristic parameters derived from the first digital representation, the first set of characteristic parameters including a first plurality of discrete pattern elements and a first set of relative orientations between combinations of neighboring pattern elements of the first plurality of discrete pattern elements; mapping a second set of characteristic parameters derived from the second digital representation, the second set of characteristic parameters including a second plurality of discrete pattern elements and a first set of relative orientations between combinations of neighboring pattern elements of the second plurality of discrete pattern elements; defining, for each particular discrete pattern element of the first plurality of discrete pattern elements, a set of candidate discrete pattern elements from the second plurality of discrete pattern elements corresponding to the particular discrete pattern element; establishing a degree of correspondence for each the candidate discrete pattern element; and determining a figure of merit between the sets of characteristic parameters responsive to an analysis of the degrees of correspondence for the sets of candidate discrete patterns.

A machine-implemented pattern testing method comparing a first digital representation of a first fingerprint under test against a second digital representation of a second fingerprint under test to establish a measure of correspondence between the fingerprints, under test, including identifying a first set of curve elements in the first digital representation, the first set of curve elements including a first plurality of curve segments derived from the first fingerprint; identifying a second set of curve elements in the second digital representation, the second set of curve elements including a second plurality of curve segments derived from the second fingerprint; producing a first set of geometric signatures for the first plurality of curve segments; producing a second set of geometric signatures for the second plurality of curve segments; and producing a figure of merit of correspondence between the digital representations by evaluating the sets of geometric signatures against each other.

A method for comparing a first digital representation of a first pattern source against a second digital representation of a second pattern source, the first digital representation including a first set of curves having an N number of curve segments and the second digital representation including a second set of curve having an N' number of curve segments, including mapping the N number of curve segments as a first set of N number of machine-readable curve segments; mapping the N' number of curve segments as a second set of N' number of machine-readable curve segments; identifying, for each first particular curve segment of the first set of machine-readable curve segments, a first pair of associated machine-readable curve segment endpoints with each the first particular curve segment extending between the first pair of associated machine-readable curve segment endpoints; identifying, for each second particular curve segment of the second set of machine-readable curve segments, a second pair of associated machine-readable curve segment endpoints with each the second particular curve segment extending between the second pair of associated machine-readable curve segment endpoints; dividing each the machine-readable curve segment of the first set of N number of machine-readable curve segments into a 2*D number of machine-readable curve segment portions, each the 2*D number of machine-readable curve segment portions of equal length with a segment junction between each adjacent pair of the 2*D number of machine-readable curve segment portions; dividing each the machine-readable curve segment of the second set of N' number of machine-readable curve segments into a 2*D' number of machine-readable curve segment portions, each the 2*D' number of machine-readable curve segment portions of equal length with a segment junction between each adjacent pair of the 2*D' number of machine-readable curve segment portions; establishing a node at each the segment junction; and calculating a first matrix $M_{i,j}$ of curvature angular data for the first set of curves, one≤i≤N and one≤j≤D, the first matrix $M_{i,j}$ defining a first angle $A_{i,j}$ for a first particular node of the $i^{th}$ machine-readable curve segment of the first set of curves with the first particular node defining a first vertex, a first leg of the first angle $A_{i,j}$ extending from the first vertex to a first leg node spaced j number of segment junctions from the first particular node, and a second leg of the first angle $A_{i,j}$ extending from the first vertex to a second leg node spaced-j number of segment junctions from the first particular node; calculating a second matrix $M'_{s,t}$ of curvature angular data for the second set of curves, one≤s≤N' and one≤t≤D', the second matrix $M'_{s,t}$ defining a second angle $A_{s,t}$ for a second particular node of the $s^{th}$ machine-readable curve segment of the second set of curves with the second particular node as a second vertex, a first leg of the second angle $A_{s,t}$ extending from the second vertex to a third leg node spaced t number of segment junctions from the second particular node, and a second leg of the angle $A_{s,t}$ extending from the second vertex to a fourth leg node spaced-t number of segment junctions from the second particular node; and comparing the first matrix M with the second matrix M' to create a plurality of correspondence metrics, each the correspondence metric measuring a degree of correspondence between a first set of candidate curve segments of the first set of curves and each curve segment of a second set of candidate curve segments of the second set of curves.

An apparatus for comparing a first digital representation of a first pattern source against a second digital representation of a second pattern source, the first digital representation including a first set of curves having an N number of curve segments and the second digital representation including a second set of curve having an N' number of curve segments, including a pattern collector producing one or more of the digital representations; and a processing system, coupled to the pattern collector, including a processor and a memory coupled to the processor, the memory storing a plurality of computer executable instructions wherein the processor executes the plurality of computer executable instructions to perform a method, including mapping the N number of curve segments as a first set of N number of machine-readable curve segments; mapping the N' number of curve segments as a second set of N' number of machine-readable curve segments; identifying, for each first particular curve segment of the first set of machine-readable curve segments, a first pair of associated machine-readable curve segment endpoints with each the first particular curve segment extending between the first pair of associated machine-readable curve segment endpoints; identifying, for each second particular curve segment of the second set of machine-readable curve segments, a second pair of associated machine-readable curve segment endpoints with each the second particular curve segment extending between the second pair of associated machine-readable curve segment endpoints; dividing each the machine-readable curve segment of the first set of N number of machine-readable curve segments into a 2*D number of machine-readable curve segment portions, each the 2*D number of machine-readable curve segment portions of equal length with a segment junction between each adjacent pair of the 2*D number of machine-readable curve segment portions; dividing each the machine-readable curve segment of the second set of N' number of machine-readable curve segments into a 2*D' number of machine-readable curve segment portions, each the 2*D' number of machine-readable curve segment portions of equal length with a segment junction between each adjacent pair of the 2*D' number of machine-readable curve segment portions; establishing a node at each the segment junction; and calculating a first matrix $M_{i,j}$ of curvature angular data for the first set of curves, one≤i≤N and one≤j≤D, the first matrix $M_{i,j}$ defining a first angle $A_{i,j}$ for a first particular node of the $i^{th}$ machine-readable curve segment of the first set of curves with the first particular node defining a first vertex, a first leg of the first angle $A_{i,j}$ extending from the first vertex to a first leg node spaced j number of segment junctions from the first particular node, and a second leg of the first angle $A_{i,j}$ extending from the first vertex to a second leg node spaced-j number of segment junctions from the first particular node; calculating a second matrix $M'_{s,t}$ of curvature angular data for the second set of curves, one≤s≤N' and one≤t≤D', the second matrix $M'_{s,t}$ defining a second angle $A_{s,t}$ for a second particular node of the $s^{th}$ machine-readable curve segment of the second set of curves with the second particular node as a second vertex, a first leg of the second angle $A_{s,t}$ extending from the second vertex to a third leg node spaced t number of segment junctions from the second particular node, and a second leg of the second angle $A_{s,t}$ extending from the second vertex to a fourth leg node spaced-t number of segment junctions from the second particular node; and comparing the first matrix M with the second matrix M' to create a plurality of correspondence metrics, each correspondence metric measuring a degree of correspondence between a first set of candidate curve segments of the first set of curves and each curve segment of a second set of candidate curve segments of the second set of curves.

A non-transitory computer readable medium with computer executable instructions stored thereon executed by a processor to perform the method of comparing a first digital representation of a first pattern source against a second digital representation of a second pattern source, the first digital representation including a first set of curves having an N number of curve segments and the second digital representation including a second set of curve having an N' number of curve segments, the method including mapping the N number of curve segments as a first set of N number of machine-readable curve segments; mapping the N' number of curve segments as a second set of N' number of machine-readable curve segments; identifying, for each first particular curve segment of the first set of machine-readable curve segments, a first pair of associated machine-readable curve segment endpoints with each the first particular curve segment extending between the first pair of associated machine-readable curve segment endpoints; identifying, for each second particular curve segment of the second set of machine-readable curve segments, a second pair of associated machine-readable curve segment endpoints with each the second particular curve segment extending between the second pair of associated machine-readable curve segment endpoints; dividing each the machine-readable curve segment of the first set of N number of machine-readable curve segments into a 2*D number of machine-readable curve segment portions, each the 2*D number of machine-readable curve segment portions of equal length with a segment junction between each adjacent pair of the 2*D number of machine-readable curve segment portions; dividing each the machine-readable curve segment of the second set of N' number of machine-readable curve segments into a 2*D' number of machine-readable curve segment portions, each the 2*D' number of machine-readable curve segment portions of equal length with a segment junction between each adjacent pair of the 2*D' number of machine-readable curve segment portions; establishing a node at each the segment junction; and calculating a first matrix $M_{i,j}$ of curvature angular data for the first set of curves, one≤i≤N and one≤j≤D, the first matrix $M_{i,j}$ defining a first angle $A_{i,j}$ for a first particular node of the $i^{th}$ machine-readable curve segment of the first set of curves with the first particular node defining a first vertex, a first leg of the first angle $A_{i,j}$ extending from the first vertex to a first leg node spaced j number of segment junctions from the first particular node, and a second leg of the first angle $A_{i,j}$ extending from the first vertex to a second leg node spaced-j number of segment junctions from the first particular node; calculating a second matrix $M'_{s,t}$ of curvature angular data for the second set of curves, one≤s≤N' and one≤t≤D', the second matrix $M'_{s,t}$ defining a second angle $A_{s,t}$ for a second particular node of the $s^{th}$ machine-readable curve segment of the second set of curves with the second particular node as a second vertex, a first leg of the second angle $A_{s,t}$ extending from the second vertex to a third leg node spaced t number of segment junctions from the second particular node, and a second leg of the second angle $A_{s,t}$ extending from the second vertex to a fourth leg node spaced-t number of segment junctions from the second particular node; and comparing the first matrix M with the second matrix M' to create a plurality of correspondence metrics, each correspondence metric measuring a degree of correspondence between a first set of candidate curve segments of the first set of curves and each curve segment of a second set of candidate curve segments of the second set of curves.

A method of evaluating an unknown set of curves from a first digital representation against an authorized set of curves from a second digital representation, including identifying a first set of curve segments from the unknown set of curves, each the curve segment extending from a first curve segment start to a first curve segment end; identifying a second set of curve segments from the authorized set of curves, each the curve segment extending from a second curve segment start to a second curve segment end; comparing, using a nested method comparison, each particular curve segment of the first set of curve segments against each the curve segment of the second set of curve segments, each the comparison establishing a figure of merit for a conformation of the particular curve segments to each other; and matching, in a decreasing order of conformation responsive to the associated figures of merit, the curve segments of the first set of curve segments to the second set of curve segments to produce, for each particular curve segment of the first set of curve segments a ranked set of candidate conforming curve segments from the second set of curve segments.

A method of evaluating an unknown set of curves from a first digital representation against an authorized set of curves from a second digital representation, including identifying a first set of curve segments from the unknown set of curves, each the curve segment extending from a first curve segment start to a first curve segment end; identifying a second set of curve segments from the authorized set of curves, each the curve segment extending from a second curve segment start to a second curve segment end; comparing, using a nested method comparison, each particular curve segment of the first set of curve segments against each the curve segment of the second set of curve segments, each the comparison establishing a figure of merit for a conformation of the particular curve segments to each other; and matching, in a decreasing order of conformation responsive to the associated figures of merit, the curve segments of the first set of curve segments to the second set of curve segments to produce, for each particular curve segment of the first set of curve segments a single unique conforming curve segment from the second set of curve segments.

The disclosed embodiments further include an additional test in which a positional orientation among nearby curve segments are also evaluated. Relative positional information among conforming curve segments in one set of curves is compared to corresponding relative positional information in the other set of curves for a relative positional figure of merit. Different implementations may use different numbers of conforming curve segments when evaluating this relative positional figure of merit.

The more that the unknown set of curves includes many closely conforming curve segments that have a high relative positional figure of merit, the higher the confidence that the unknown pattern source is from the authorized user. Any of the highly conforming curve segments, particularly those having a high relative positional figure of merit, may be used as curve segment of interest (or points along the curve segment used as points of interest) for further automated processing to improve a confidence of a match of the unknown source to the authorized source.

Any of the embodiments described herein may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

Other features, benefits, and advantages of the present invention will be apparent upon a review of the present disclosure, including the specification, drawings, and claims.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION OF THE INVENTION

Figure 1:
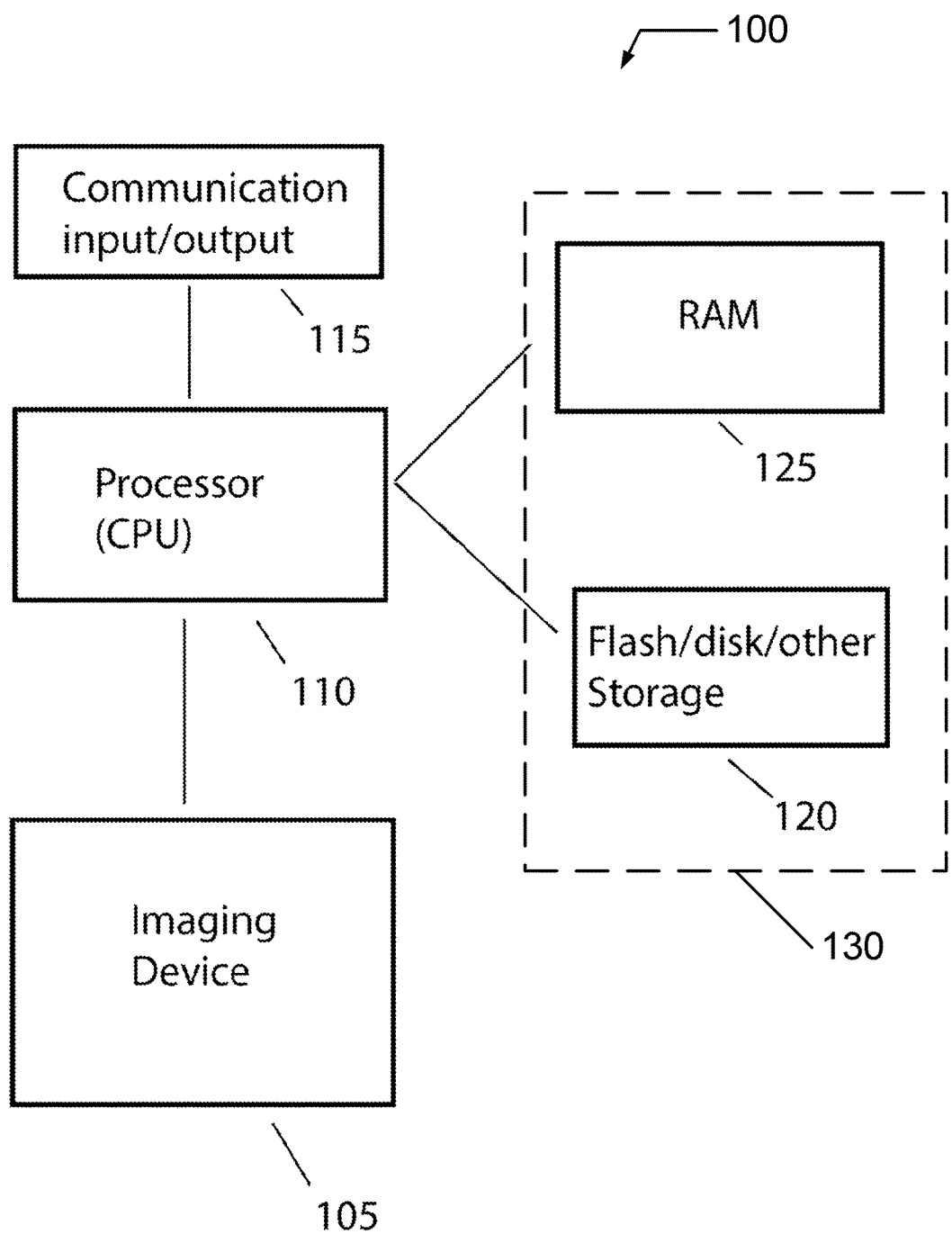
FIG. 1 illustrates a block schematic diagram of an embodiment for a fingerprint verification system.

Some of the disclosed embodiments of the present invention provide a system, method, and computer program product for decreasing or eliminating any requirement for minutia during fingerprint verification. The following description is presented to enable one of ordinary skill in the art to make and use the invention and is provided in the context of a patent application and its requirements.

Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Definitions

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The following definitions apply to some of the aspects described with respect to some embodiments of the invention. These definitions may likewise be expanded upon herein.

As used herein, the term "or" includes "and/or" and the term "and/or" includes any and all combinations of one or more of the associated listed items. Expressions such as "at least one of," when preceding a list of elements, modify the entire list of elements and do not modify the individual elements of the list.

As used herein, the singular terms "a," "an," and "the" include plural referents unless the context clearly dictates otherwise. Thus, for example, reference to an object can include multiple objects unless the context clearly dictates otherwise.

Also, as used in the description herein and throughout the claims that follow, the meaning of "in" includes "in" and "on" unless the context clearly dictates otherwise. It will be understood that when an element is referred to as being "on" another element, it can be directly on the other element or intervening elements may be present therebetween. In contrast, when an element is referred to as being "directly on" another element, there are no intervening elements present.

As used herein, the term "set" refers to a collection of one or more objects. Thus, for example, a set of objects can include a single object or multiple objects. Objects of a set also can be referred to as members of the set. Objects of a set can be the same or different. In some instances, objects of a set can share one or more common properties.

As used herein, the term "adjacent" refers to being near or adjoining. Adjacent objects can be spaced apart from one another or can be in actual or direct contact with one another. In some instances, adjacent objects can be coupled to one another or can be formed integrally with one another.

As used herein, the terms "connect," "connected," and "connecting" refer to a direct attachment or link. Connected objects have no or no substantial intermediary object or set of objects, as the context indicates.

As used herein, the terms "couple," "coupled," and "coupling" refer to an operational connection or linking. Coupled objects can be directly connected to one another or can be indirectly connected to one another, such as via an intermediary set of objects.

As used herein, the terms "substantially" and "substantial" refer to a considerable degree or extent. When used in conjunction with an event or circumstance, the terms can refer to instances in which the event or circumstance occurs precisely as well as instances in which the event or circumstance occurs to a close approximation, such as accounting for typical tolerance levels or variability of the embodiments described herein.

As used herein, the terms "optional" and "optionally" mean that the subsequently described event or circumstance may or may not occur and that the description includes instances where the event or circumstance occurs and instances in which it does not.

As used herein, the term "fingerprint" means a map of contrasting amplitude elements from a pattern source. As such, a ridge/furrow pattern on a human finger is included as a fingerprint. Additionally, zebra stripe patterns, retinal vein patterns, or other collections of contrasting amplitude elements having a set of a plurality of sufficiently long succession of similarly contrasted elements.

FIG. 1 illustrates a block schematic diagram of an embodiment for a fingerprint verification system 100. System 100 includes an imaging device 105, a processor 110, an input/output (I/O) system 115, a nonvolatile memory 120 and a RAM memory 125, with memory 120 and memory 125 collectively defining a memory system 130. System 100 is described, in the disclosed embodiment, as a fingerprint verification system as opposed to some other type of fingerprint checking/matching system. In a fingerprint verification system, the system attempts to measure a correspondence between a pair of fingerprints (one-on-one) in order to establish, within some level of confidence, whether one pattern source of one fingerprint is the same or sufficiently close as a pattern source of the other fingerprint. This is contrasted with an identification system that determines which pattern source generated a particular fingerprint. A verification system may be used as an identification system when a decrease in power/speed is acceptable, given fixed resources.

System 100 may function as a basic computer in implementing the present invention for accessing and processing fingerprints, fingerprint images, and sets of curves derived from a fingerprint as further described below. Processor 110 may include one or more central processing units (CPUs), selected from one or more of an x86, x64, ARM, or the like, architectures, connected to various other components, such as by a system bus.

Imaging device 105 produces an image of a fingerprint; either directly (e.g., it is a sensor or imager for a pattern source or an artifact from a pattern source) or it accesses a data structure or memory to obtain the image. The image may be of all or a portion of an entire fingerprint. Sometimes a portion of a fingerprint image may appear to be a set of discrete curves. System 100 is a general purpose computer having a large number of suitable implementations for accessing and processing resources fingerprints, fingerprint images, portions of fingerprint images, and sets of curves derived from a fingerprint. Sensors that may be used with system 100 include charge-coupled devices (CCD), complementary metal oxide semiconductor (CMOS), capacitive, thermal, optical, electro-optical, RF modulation, acoustic, or other image sensing devices, such as those available from a wide range of manufacturers including IDEX ASA, Fujitsu, Atmel, Apple, Synaptics, Infineon, Sony, Integrated Biometrics, and Fingerprint Cards for example. Image arrays may be relatively small (e.g., 50×50 pixels, 128×128 pixels to a CIF size of 352×288 pixels or larger), each pixel having a pixel depth of but not limited to eight bits. System 100 uses a fingerprint image produced from source 105. In some cases, system 105 may preprocess images, such as performing image keystone corrections (a geometric correction used to account for optical distortions associated with optical/prism based systems when returning an image size proportionate to fingerprint size or image reconstruction to assemble an image taken in bands as a finger is 'swiped' across the sensor.

An operating system runs on processor 110, providing control and coordinating the functions of the various components of the system. The operating system may be one of the commercially available operating systems such as Microsoft (e.g., windows), Apple (e.g., IOS or Mac OS X), Google (e.g., Chrome or Android), as well as UNIX and AIX operating systems, though some embodiments may use a custom control for providing minimal, tailored functions. Custom programs, controlled by the system, include sets of instructions executable on processor 110 that are moved into and out of memory. These sets of instructions, when executed by processor 110, perform the methods and automated machine-implemented processes described herein. Source 105, I/O communication system 115, and memory system 130 are each coupled to processor 110 via a bus and with memory system 130 including a Basic Input/Output System (BIOS) for controlling the basic system functions.

I/O system 115 interconnects system 100 with outside devices or networks, enabling the system to communicate with other such systems over a communications system (e.g., directly wired, Local Area Network (LAN) or Wide Area Network (WAN), which includes, for example, the Internet, the WEB, intranets, extranets, and other public and private networks, wired, optical, or wireless). The terms associated with the communications system are meant to be generally interchangeable and are so used in the present description of the distribution network. I/O devices are also connected to the system bus via I/O system 115. A keyboard, a pointing device (e.g., mouse, trackball or other device) and a display or indicator may be interconnected to system 100 through I/O system 115. It is through such input devices that the user may interactively relate to the programs for manipulating the resources, images, subsystems, processes and system according to the present invention. By using the aforementioned I/O devices, a user is capable of inputting information to the system through the keyboard or mouse and receiving output information from the system. The system may contain a removable memory component for transferring data, for example images, maps, instructions, or programs.

In use, system 100 tests a first set of curves from a pattern source, such as a fingerprint portion from a live finger, one-on-one against each registered set of curves in a known database recorded in memory 130.

Figure 2:
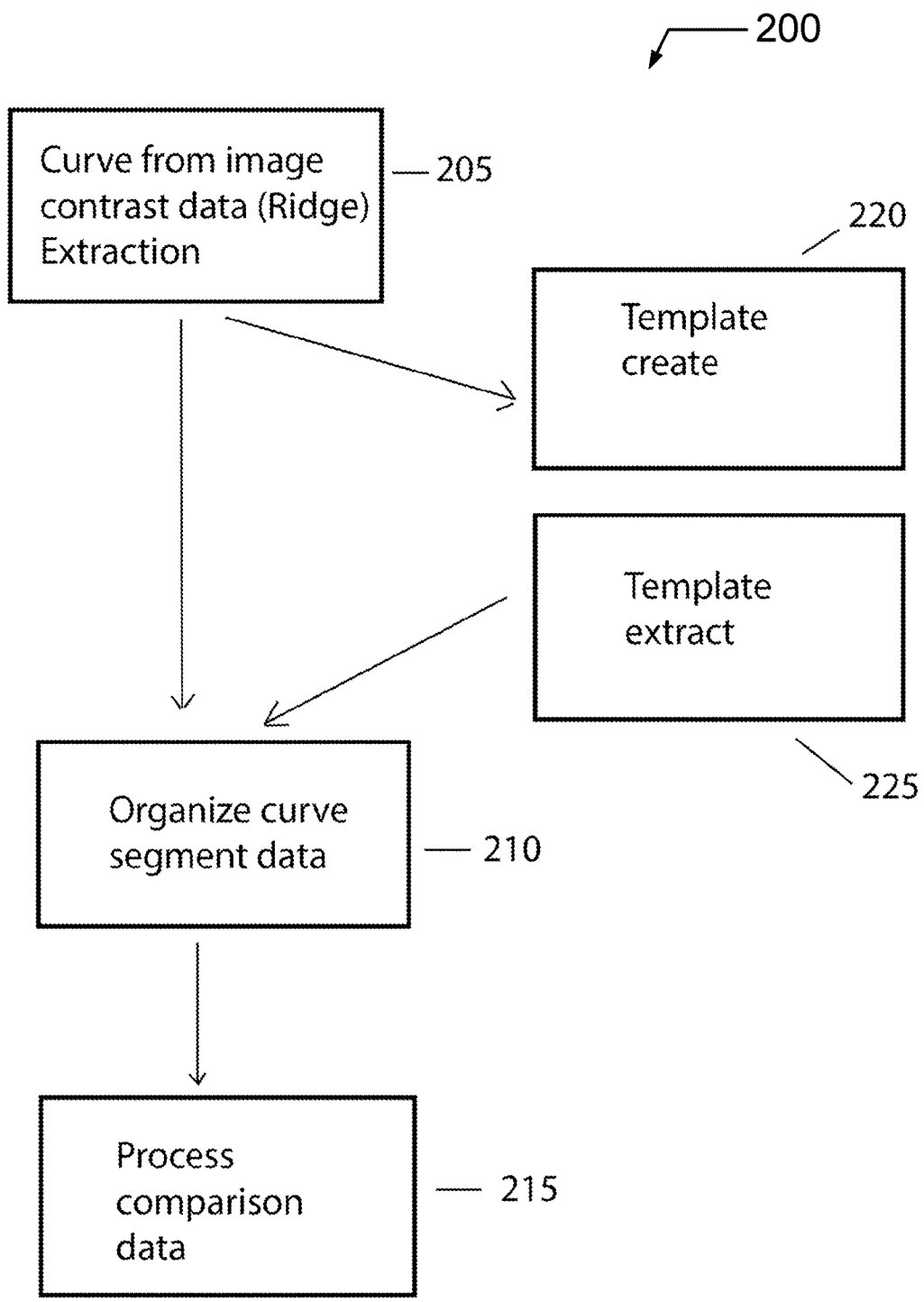
FIG. 2 illustrates a flow diagram of an embodiment for a fingerprint verification process.

FIG. 2 illustrates a flow diagram of an embodiment for curve comparison process 200. Process 200, executed by system 100 for example, includes three main subprocesses: step 205 is a curve segment extraction process; step 210 is an organize curve segment data subprocess following step 205; and step 215 is a compare data subprocess following step 210. Process 200 optionally includes template processing steps: a template create step 220 and a template extraction step 225.

System 100 uses much of the available curve segment data for image comparison. Preparation for comparison is step 205 while actual curve segment comparison includes two basic steps: organize step 210 and compare step 215.

Curve segment extraction step 205 creates a set of curve segments from an image. There are many ways that an image may be processed to produce the set of curve segments, some of which are dependent upon the type of sensor, type of image, and resources of system 100. A preferred curve extraction process explained further in U.S. Pat. No. 7,512,256, entitled "SYSTEM, METHOD, AND COMPUTER PROGRAM PRODUCT FOR RIDGE MAP FORMATION" may be adapted for extraction of curve segments, the contents of which are hereby expressly incorporated in its entirety by reference thereto for all purposes.

In the preferred embodiment, registration images produced from sensor 105 have curve segment maps extracted and templates made from the maps are stored efficiently into memory system 130 as encrypted templates for security and efficient use of memory. When the registered images are stored as templates, system 100 produces appropriate curve segment maps from the templates for use. The optional templates and encryption\decryption systems are explained further in U.S. Pat. No. 7,697,773, entitled "SYSTEM, METHOD, AND COMPUTER PROGRAM PRODUCT FOR IMAGE COMPRESSION/DECOMPRESSION," the contents of which are hereby expressly incorporated in its entirety by reference thereto for all purposes. Registered curve segment maps and/or templates from the registered curve segment maps may be stored in FLASH memory 120 for long term storage, and moved into RAM 125 for processing.

Figure 3:
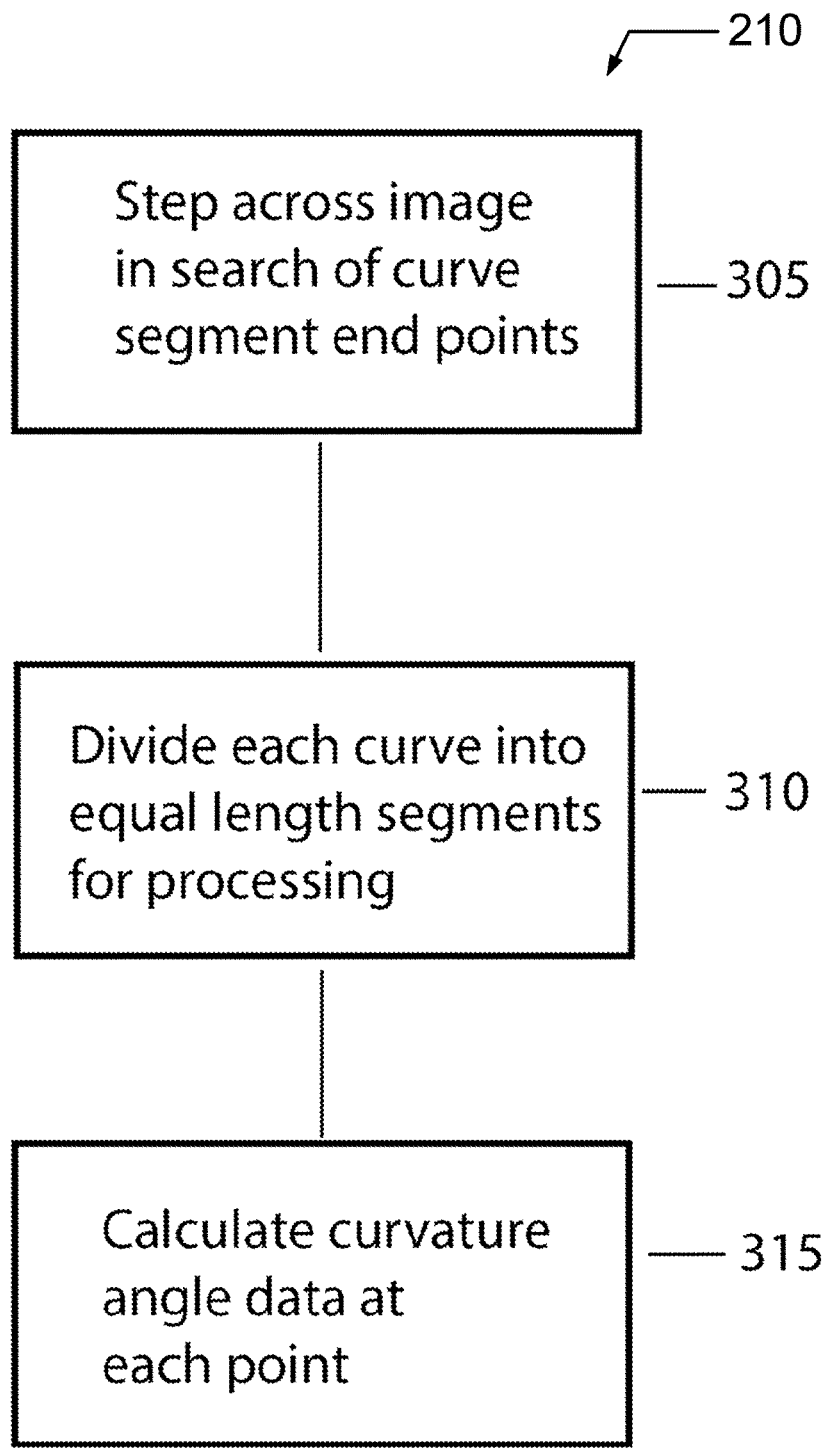
FIG. 3 illustrates a flow diagram for an embodiment for the organize subprocess illustrated in FIG. 2.

FIG. 3 illustrates a flow diagram for an embodiment of organize subprocess 210 illustrated in FIG. 2. Step 210 includes three substeps: a step substep 305, a divide substep 310, and a calculate substep 315.

Substep 305 steps across an image map for curve segment endpoints, and collects the endpoints into an array list. In any given image map of a portion of a fingerprint, a curve segment endpoint may be an actual curve end or it may be an artificial truncation of a curve element due to imaging device 105 and a relative position of the pattern source when imaging device sourced the image map being analyzed. Each set of curves of an image map includes a plurality of curve segments, each curve segment identified by an unbroken series of pixels extending from one curve segment endpoint to another curve segment endpoint along the same curve segment. A pixel for any given curve segment is adjacent at least one other pixel of the given curve segment, and adjacent no more than two such pixels (for some of the disclosed embodiments, system 100 allows a max of two, other embodiments in line (curve) drawing it is possible to have more than 2 depending upon the line/curve drawing method). When identifying curve segments of an image map, information regarding the pattern source and/or pattern may be used to aid in optimization. For a human fingerprint, there are various characteristics that aid in identification of curve segments. For example, curve segments are not continually straight, nor does any curve segment turn too sharply.

Substep 310 divides each identified curve segment into a series of equal length curve sub-segments for processing. A curve segment point is defined at a junction of each pair of adjoining curve sub-segments. These curve segment points, along with the curve segment endpoints, have thus been established at the conclusion of substep 310. In the discussion herein, a curve segment is identified as R(s), and these curve segment points along R(s) are identified as P(n), n=3 to a total number of curve segment points parsed along curve segment R(s) referred to as $n_{max}$. For the disclosed embodiments, n is a minimum of three as there are two endpoints and one midpoint. Practically, n is much larger than 3, on the order of 20 or more with it being a function of the image size and pattern source.

Substep 315 determines curve segment curvature angle data at each curve segment point. For each curve segment point P(n), determine an angle A(n) having a vertex at P(n), a first leg beginning at the vertex and extending to a first curve segment point P(n+d), and a second leg beginning at the vertex and extending to a second curve segment point P(n−d) for an integer d selected from the set {1 . . . x}, x less than or equal to $n_{max}/2$. Substep 315 establishes a set of A(n) for each curve segment point P(n) (alternatively the curve segment could also be used equally) along R(s) of an image map. There are other ways that a curvature of a curve segment may be characterized and used to determine a figure of merit for determining whether a particular curve segment in one image sufficiently conforms to a particular curve segment in another image.

Figure 4:
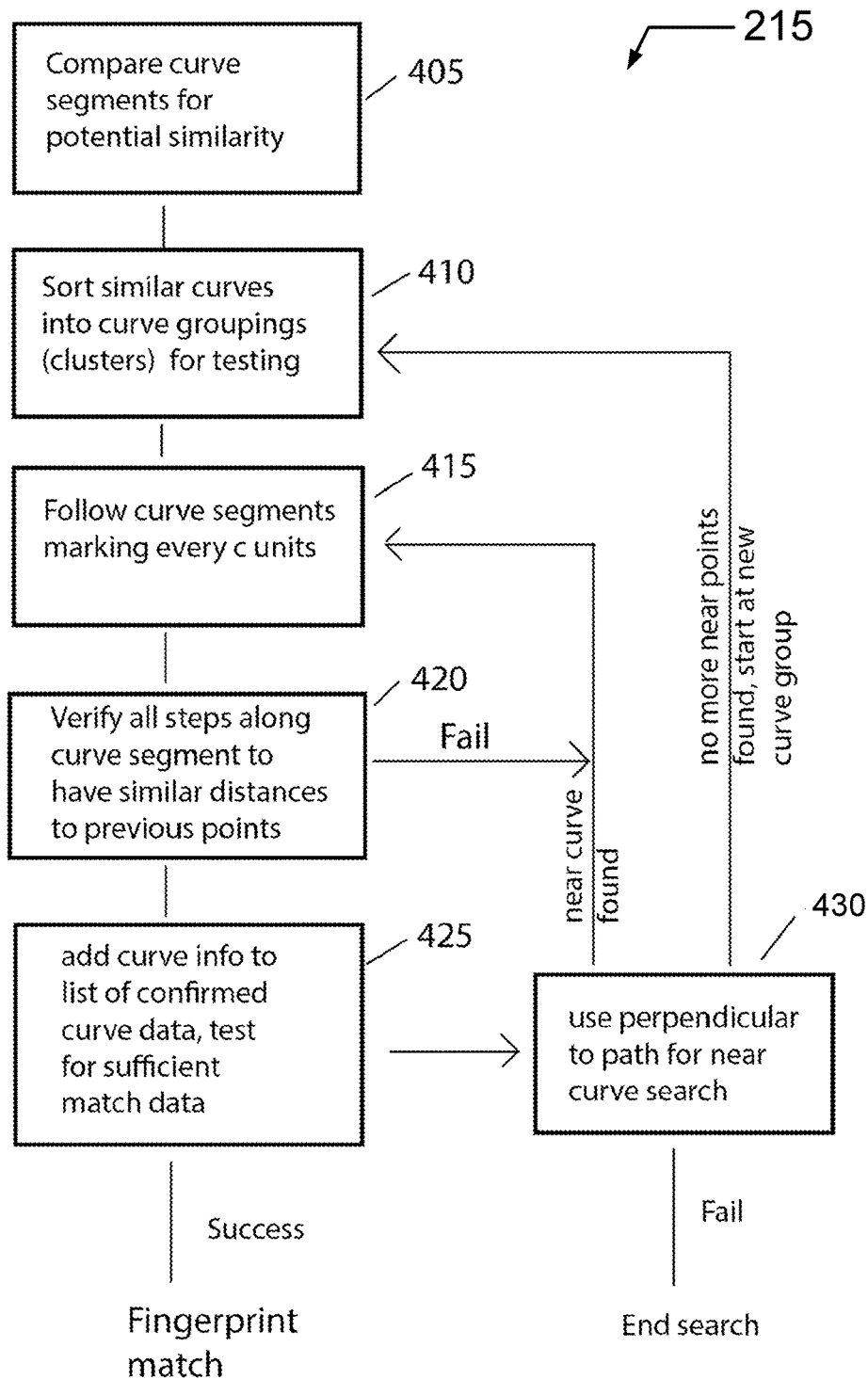
FIG. 4 illustrates a flow diagram for a preferred embodiment for the comparison subprocess illustrated in FIG. 2.

FIG. 4 illustrates a flow diagram for a preferred embodiment for the comparison subprocess step 215 illustrated in FIG. 2. Comparison subprocess step 215 evaluates a first image having a set of curve segments (for example, an image from a stored history (h) of registered/authorized images) against an image under test (t) (for example, a live image from a fingerprint sensor). Comparison subprocess step 215 is, effectively, comparing every curve segment of the image from a stored history against every curve segment of the image under test. A goal is to find conforming curve segments common to both images. A figure of merit is calculated for each comparison. Further testing is performed to determine a relative positional figure of merit for groupings of candidate conforming to make sure that a set of identified conforming curve segments found in each image actually share a common relative positional relationship. The greater the number of closely conforming curve segments that share a common relative positional relationship, the greater a confidence that the two images (sets of curves) match. For some embodiments, a high enough confidence from step 215 may offer acceptable security. In other cases, results from step 215 may be used to initiate a more rigorous matching process, with identified conforming curve segments, or specified curve segment points along the identified conforming curve segment, providing one or more features of interest for the rigorous testing.

Step 215 includes a set of substeps 405-430. Substep 405 compares curve segments for potential similarity. Substep 410 sorts similar curves into curve groupings (e.g., clusters) for testing. Substep 415 follows each curve segment marking every c units. Substep 420 performs a test to verify all increments along a curve segment have similar distances to previous increments and on neighboring curve segments previously verified. When the test fails, comparison subprocess step 215 returns to substep 415.

When the test at substep 420 succeeds, comparison subprocess step 215 proceeds to substep 425 to add curve information to list of confirmed curve data. Substep 425 also tests for sufficient data match. When the test at substep 425 succeeds, a "match" status is set for the two images being compared.

When the test at substep 425 does not succeed, comparison subprocess step 215 proceeds to substep 430 to use perpendicular to path calculations to identify neighboring conforming curve segments. When a new neighboring conforming curve segment is found, comparison subprocess step 215 proceeds to substep 415 from substep 430. When a new neighboring conforming curve segment is not found, comparison subprocess step 215 proceeds to substep 410 from substep 430 to start a new curve group. When a new neighboring conforming curve segment is not found in the same curve group, and it is not possible to start a new curve group, comparison subprocess step 215 fails and searching ends. If there are no more similar curves to begin forming a group, there is no more data to test (curves that have similar features among other similar curves), the test ends.

In operation, two images are compared as noted herein, each referred to in the following discussion as an image under test (it being the case that in some applications, one image under test is from a known authorized registration database and the other image under test is from an unknown pattern source, it being desired to, for example, verify that the unknown pattern source is authorized based upon a match into the known database). Each image includes a collection of curve segments R(s), s an integer from 1 to a total number of curve segments. An $s^{th}$ curve segment of an image number one is R(t1)(s) and an $s^{th}$ curve segment of an image number two is R(t2)(s). Curve segment points along a curve segment R(t1)(s) of image number one are identified as P(t1)(n) and curve segment points along a curve segment R(t2)(s) of image number two are identified as P(t2)(n). An angle is determined for each curve segment point along each curve segment of each image. An angle for an $n^{th}$ point along curve segment R(t1)(s) is P(t1)A(n) and an angle for an $n^{th}$ point along curve segment R(t2)(s) is P(t2)A(n).

The comparison, when unoptimized, performs a nested method comparison in which, for every curve segment R(t1)(s), s=1 to $S_{t1max}$ of image map one and every curve segment R(t2)(s), s=1 to $S_{t2max}$ of image map two, a comparison is made of curve segment combinations of image map 1 to image map 2 centered at each point P(n). That is, for example, R(t1)A(n) is compared to R(t2)A(n), R(t1)A(n) is compared to R(t2)A(n+1), and R(t1)A(n) is compared to R(t2)A(n+2) for all valid comparisons. A maximum number of curve segments points along any particular curve segment is $n_{max}$ and each angle A(i) is determined using a number d of curve segment points spaced from the $i^{th}$ curve segment point. Therefore the first available angle of a curve segment R(t1)(s) is P(t1)A(1+d) and the last available angle for R(t1)(s) is P(t1)A($n_{max}$−d).

Comparing a curve segment requires evaluating each point angle along the curve element. Disclosed is a comparison engine which sums absolute values of angular differences at each point along the curve segment. Two curve segments are said to be similar and a candidate for conformance based upon how close this difference sum, referred to as a figure of merit M approaches zero (i.e., the lowest difference sums are the closest conforming curve segments).

$$= \sum_{i=1+d}^{n_{max}-d} |(P(t2)A(i)R(t2)(j) - P(t1)A(i)R(t1)(k)| \quad j = 1 \text{ to } S_{t1max},$$

$$k = 1 \text{ to } S_{t2max}$$

Each value of $M_{j,k}$ identifies a figure of merit for a conformance of a particular curve segment of image one (the kth curve segment or R(t1)(k) as compared to a particular curve segment of image two (the jth curve segment or R(t2)(j)). The lowest values for $M_{j,k}$ represent the best candidates for conformance.

Once performing these comparisons, care is taken to account for the possibility that similar curve segment end points may not exist in both image maps even for the same curve segment imaged in both maps. One reason for this possibility is that the image capture size area may be positioned differently when obtaining the different images, and the visible boundary of the pattern is different.

Also of note is that the angles are determined based upon information local to the curve segment. This means that the angle values are rotationally independent and are not affected by rotations of a pattern within an image map.

Once candidate conforming curve segments are established by the first part of the comparison subprocess 215, a second part evaluates positional relativity among them. This evaluation includes grouping the best matching curve segments into one or more clusters in each image and then quantifying relative measurements between the curve segments of the group in both images. Disclosed is a simple methodology of determining a figure of merit for this relative positional figure of merit. For each curve segment of a group of an image map, the end points and a midpoint are used to test initial location proximity. Triangulation differences among distances from each point on one curve segment to the three identified points of each other curve segment in the group for both image maps. These collective values provide one mechanism to confirm relative positions of the candidate conforming curve segments. The use of triangulation also offers a rotationally independent confirmation.

Comparison substep 215 thus identifies possibly conforming curve segments common to both image maps. These curve segments are clustered together in each image map and then relative positional information among the curve segments of the cluster in both image map are compared. When all the positional information sufficiently matches for all the curve segments of the cluster between the image maps, the creation of a cluster is a success.

The greater the number of conforming curve segments in a cluster having a high relative positional figure of merit, the better the possibility that the two image maps are from the same pattern source. The curve segments in the cluster with the best match are used for the more rigorous pattern matching to efficiently verify a match with a very high confidence.

Figure 5:
FIG. 5 illustrates an image typical of an output from a fingerprint sensor.

FIG. 5-FIG. 17 illustrate operation of system 100 implementing the processes described in cooperation with FIG. 2-FIG. 4. FIG. 5 illustrates an image 500 typical of an output from a fingerprint sensor, with image 500 of the type from which system 100 creates a curve segment map. As noted herein, particular challenges result when the fingerprint sensor has a reduced image capture area size such that image 500 from a small sensor would be a small portion of the illustrated image. Ridge/furrow amplitude information may be presented in eight-bit grayscale, with white having a value of "255" and black having a value of "0." Many parts of a curve segment will have values greater than or equal to 0, while furrows will have values less than or equal to 255. The curve segment map production is important to both accurately and reproducibly generate curve segment maps from portions of fingerprint images. The curve segment maps have feature points of interest that are typically endpoints of a curve element, or points along a curve segment. These features are important in the screening and matching, so reproducibility is important.

Figure 6:
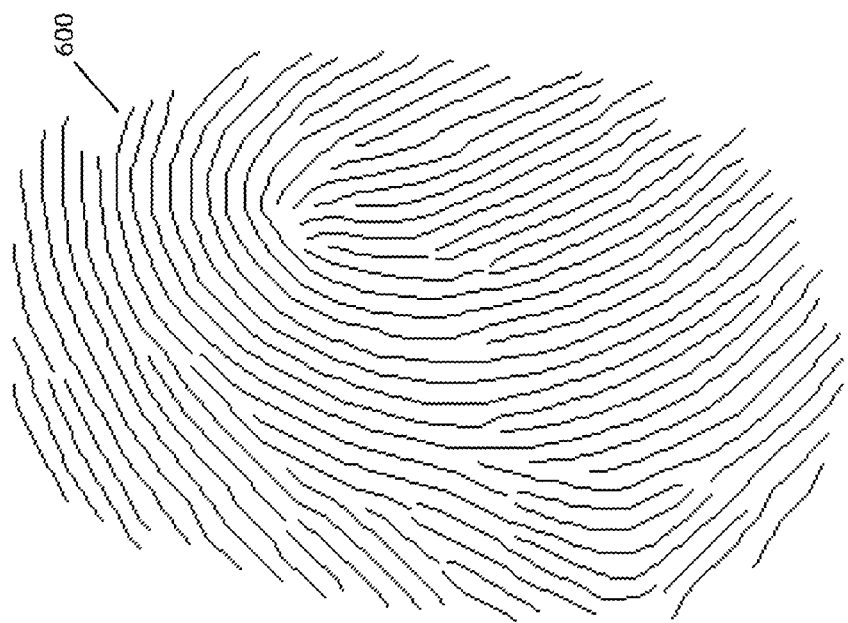
FIG. 6 illustrates a ridge map extracted from the image illustrated in FIG. 5.

FIG. 6 illustrates a curve segment map 600 extracted from image 500 illustrated in FIG. 5. Map 600 is a binary map in which ridges are depicted as black pixels and non-ridges as white pixels. Map 600 is qualified by system 100 to ensure that it contains a sufficient amount of identifiable data in proper proportion for the intended use. Map 600 may be scaled from the original image size to reduce memory requirements while potentially sacrificing some accuracy. Map 600 is shown at a ratio of 1:1 with image 500.

Figure 7:
FIG. 7 illustrates a curve segment processing for matching.
Figure 8:
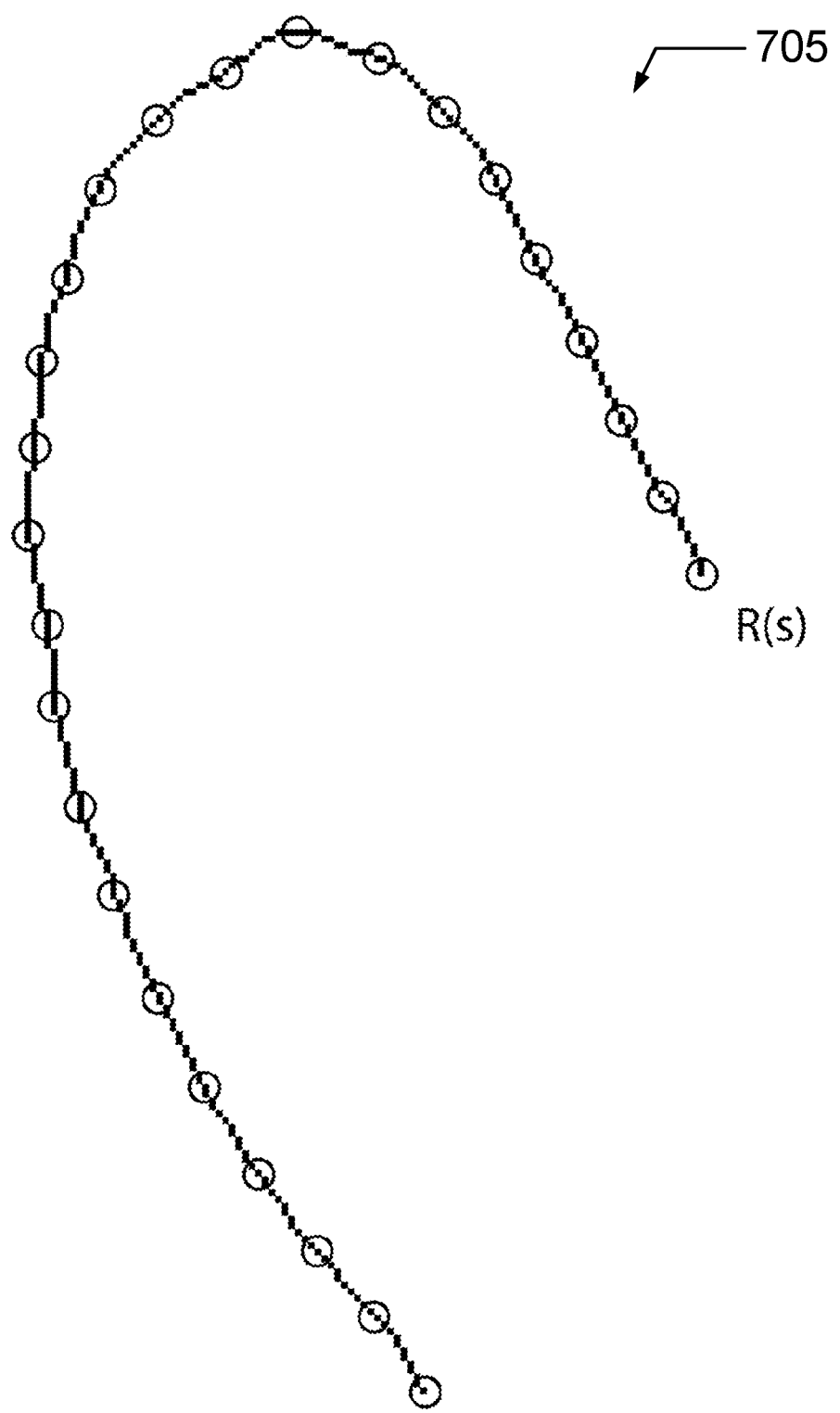
FIG. 8 illustrates a curve segment identified in FIG. 7.

FIG. 7 illustrates three curve segments, R(s), R(s+1), and R(s+2) processing from map 600 for matching. A particular curve segment 705, corresponding to curve segment R(s), is divided into equal length portions as identified herein, for example substep 310. FIG. 8 illustrates curve segment 705 from FIG. 7 along with the identified curve segment points.

Figure 9:
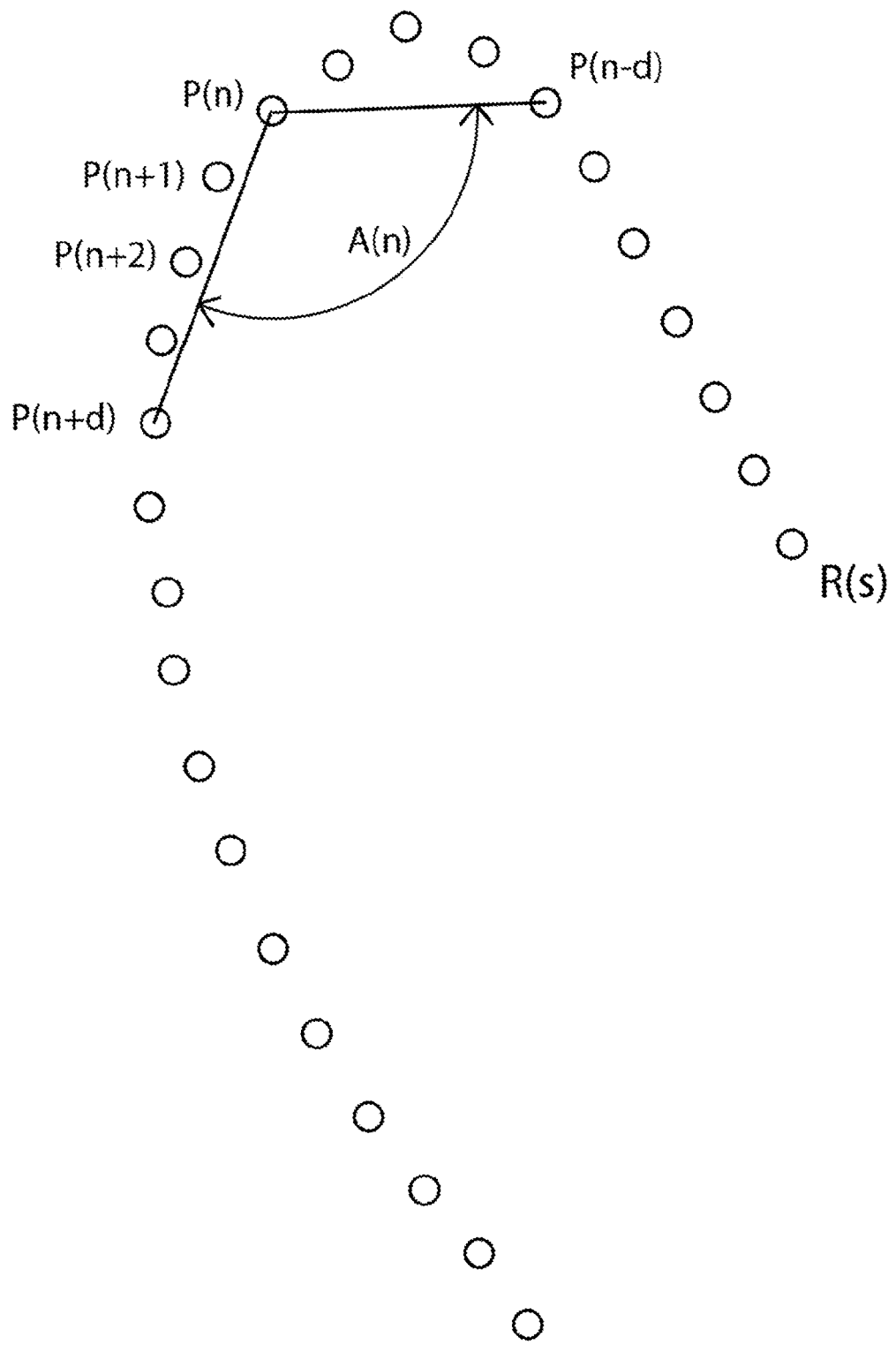
FIG. 9 illustrates an embodiment for a calculation of a curve segment parameterization.

FIG. 9 illustrates an embodiment for a calculation of a curve segment parameterization of curve segment 705. Substep 315 described herein is particular implementation of curve segment parameterization in which system 100 calculates curvature angle data for each curve segment point. The illustrated embodiment, other embodiment may use different values, calculates curvature angle data for angle A(n). The vertex of angle A(n) is at P(n) of R(s) and uses d=4 to determine the position of the first leg (P(n−4)) and the second leg (P(n+4)). Different values of d typically produce different values for angle A(n).

Figure 10:
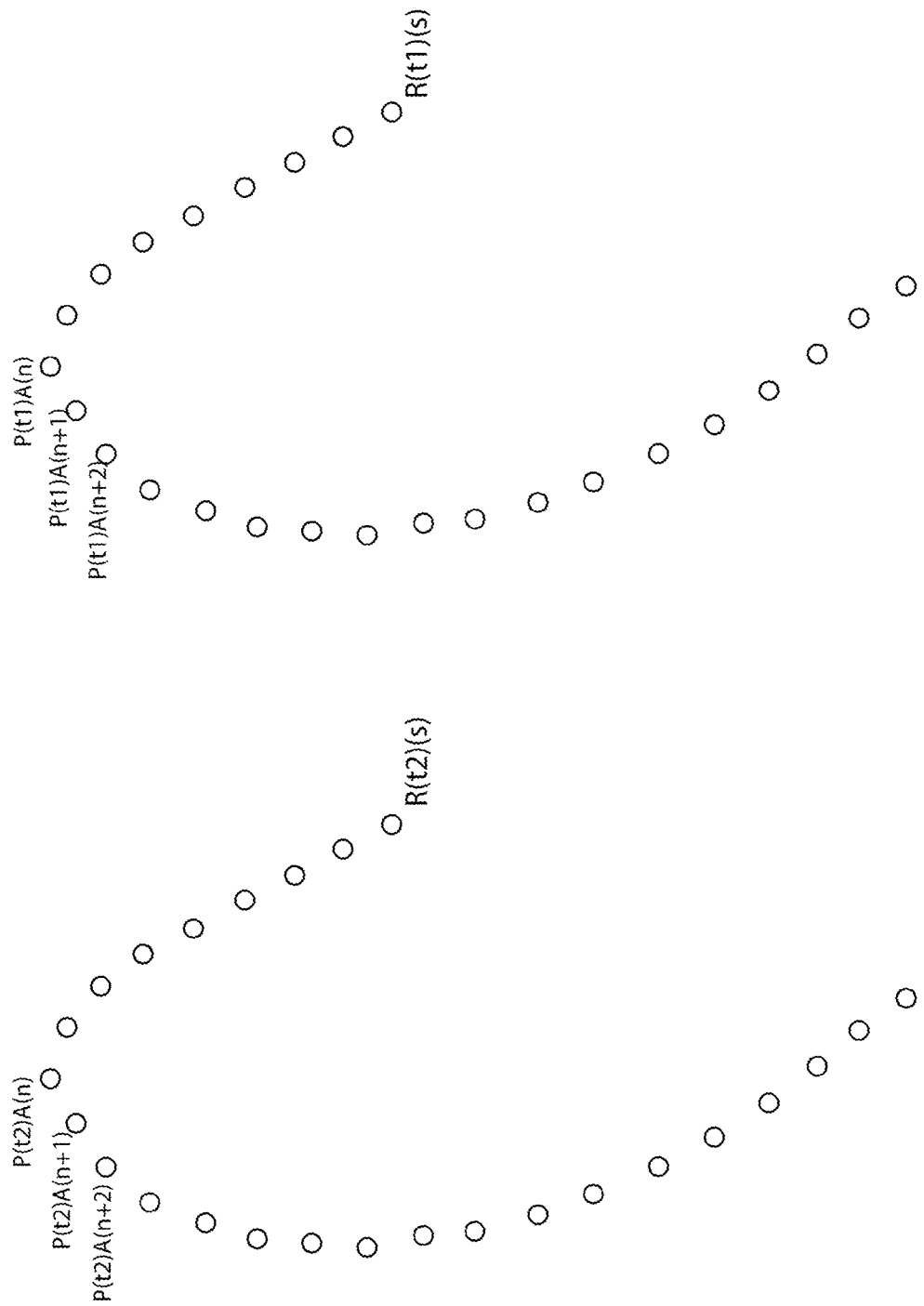
FIG. 10 illustrates an establishment of corresponding points along a test comparison of a curve segment from two patterns under test.

FIG. 10 illustrates an identification of corresponding curve segment points along a pair of test curve segments taken from different sets of curves that are to be compared. A first test curve segment R(t1)(s) has been divided into equal length segments with 3 points identified for calculation of curvature angle data: P(t1)A(n), P(t1)A(n+1), and P(t1)A(n+2). Similarly a second test curve segment R(t2)(s) has been divided into equal length segments with 3 corresponding points identified for calculation of curvature angle data: P(t2)A(n), P(t2)A(n+1), and P(t2)A(n+2).

Figure 11:
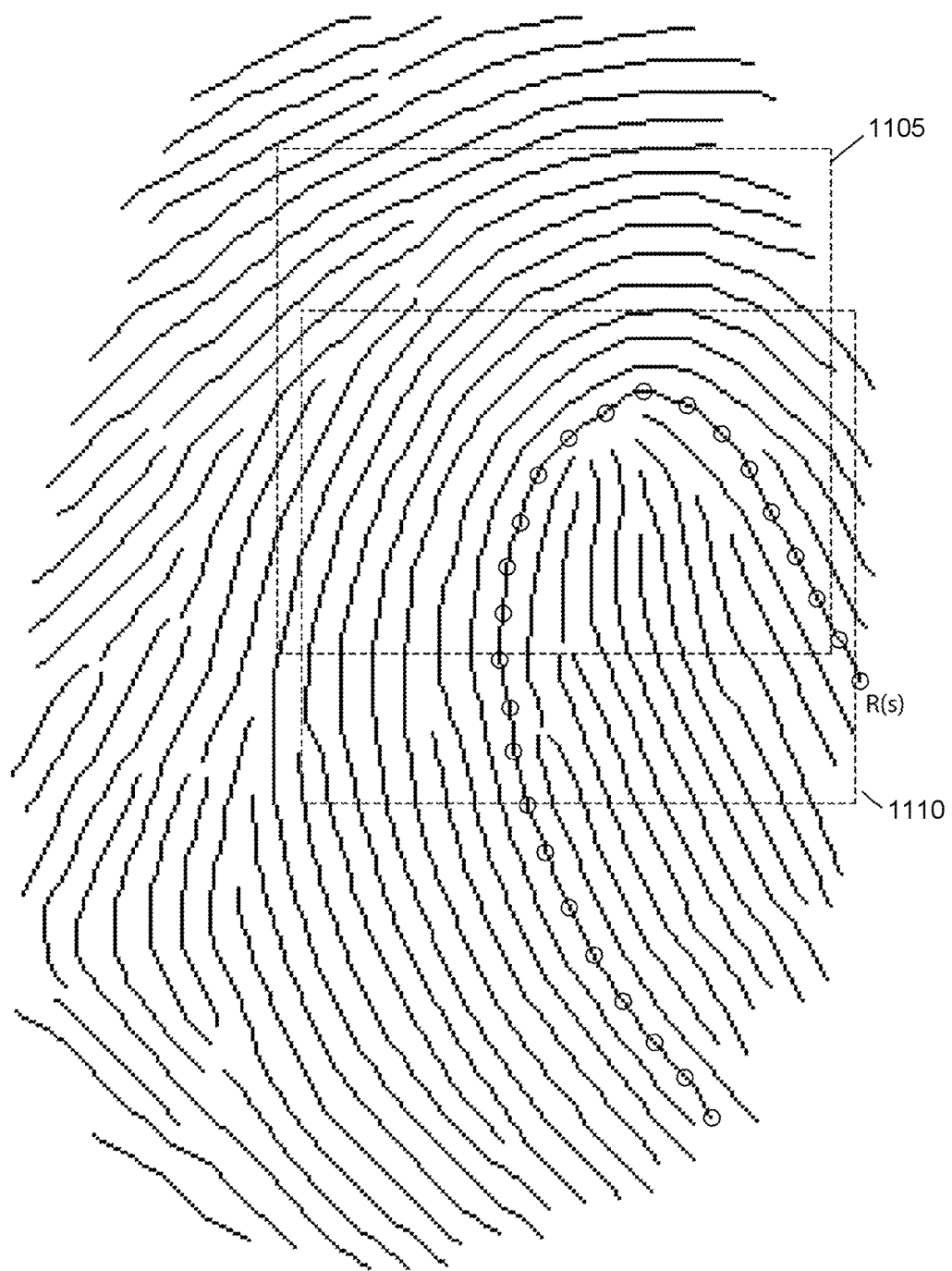
FIG. 11 illustrates different windows from a pattern such as may be defined by a small image capture size sensor.

FIG. 11 illustrates different image portions from a pattern such as may be defined by a small image capture size sensor. FIG. 11 includes image 600 illustrated in FIG. 7 along with a first pattern portion 1105 and a second pattern portion 1110. These pattern portions help to highlight challenges with small image capture area size sensors. For example, both pattern portions are taken from the same pattern source with first pattern portion 1105 registered into an authorization database. Second pattern portion 1110 results when a user later uses the same sensor to attempt verification by using the same finger on the same sensor. The image capture from the small sensor produces second pattern portion of the same fingerprint, however the resulting set of curves of the pattern portions are different. Verification is made easier when system 100 is able to find conforming curve segments in both pattern portions that may be used by the matcher to test the verification.

Figure 12:
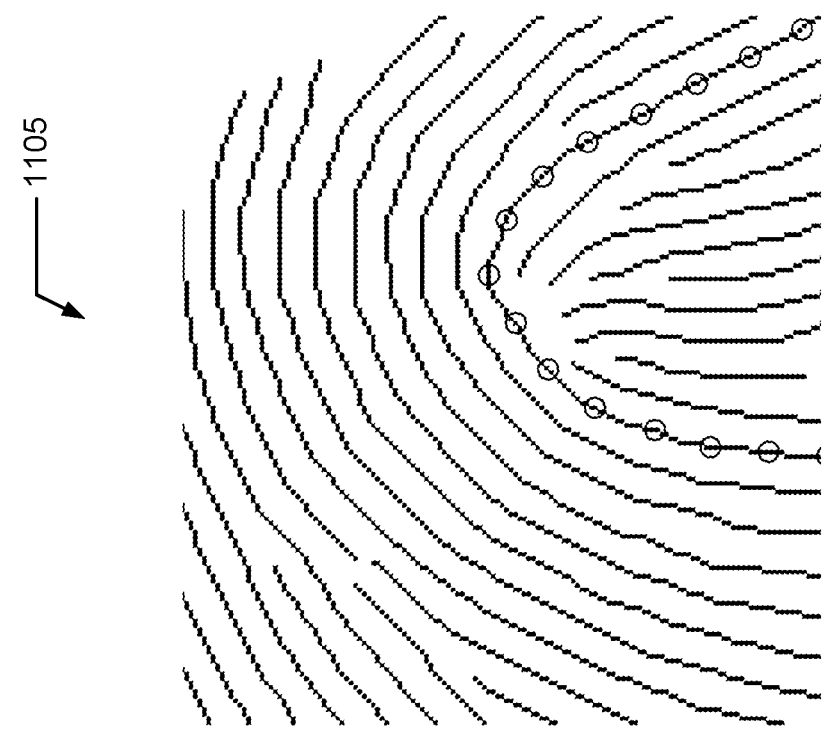
FIG. 12 illustrates the different windows illustrated in FIG. 11.
Figure 12:
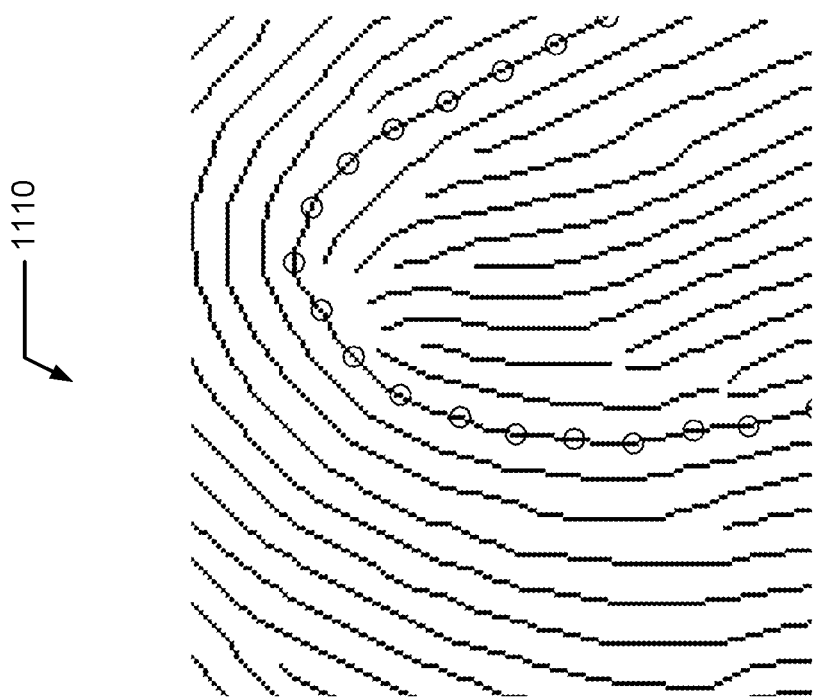

FIG. 12 illustrates the different pattern portions, first pattern portion 1105 and second pattern portion 1110, identified in FIG. 11, as side-by-side images under test.

Figure 13:
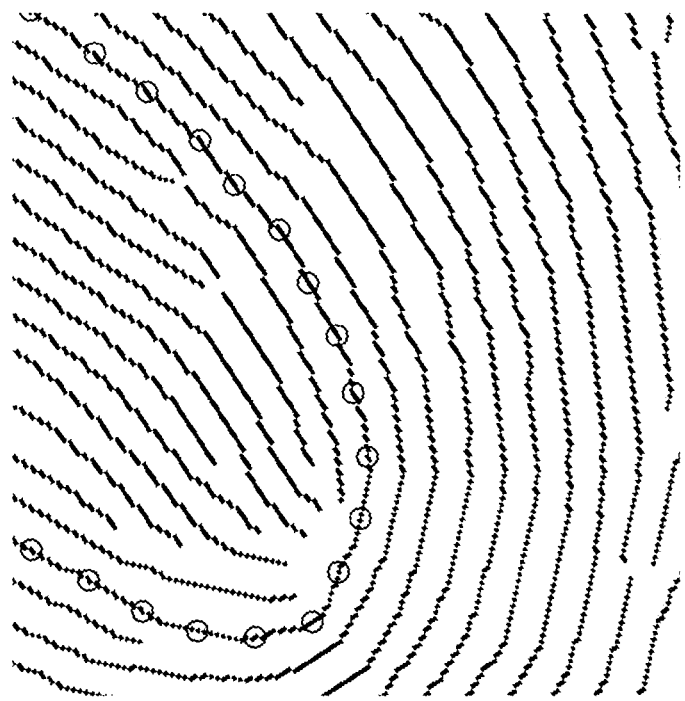
FIG. 13 illustrates the different windows illustrated in FIG. 11, with one image portion in a window rotated relative to the other.
Figure 13:
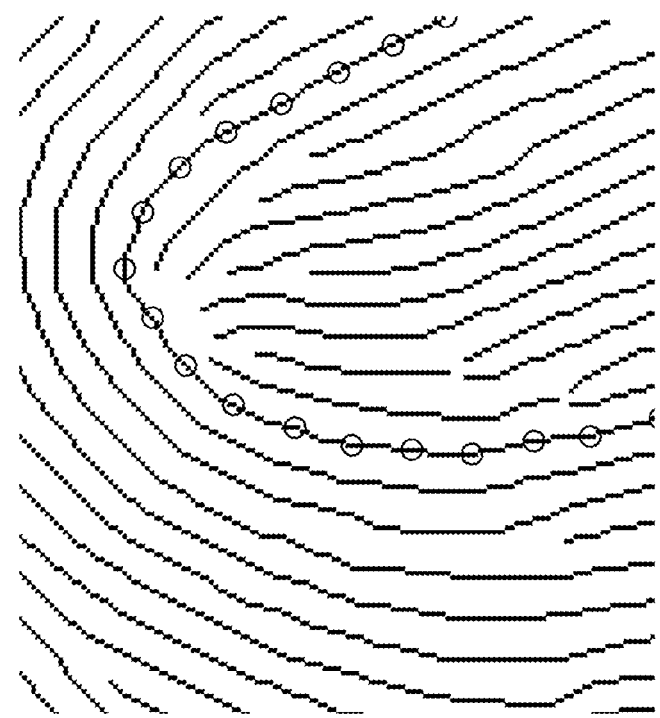

FIG. 13 illustrates different pattern portions from those of FIG. 11 and FIG. 12 to illustrate resulting pattern portions that arise when there is a different orientation of the pattern source and the small sensor between the time that the first pattern portion is captured and the later time that the second pattern portion is captured. Specifically there is relative rotation in addition to translation. This helps to highlight an advantage of some of the disclosed embodiments which offer rotational independence in the processing steps. This rotational independence allows system 100 to ignore the type of rotation illustrated in FIG. 13 when comparing the two sets of curves.

Figure 14:
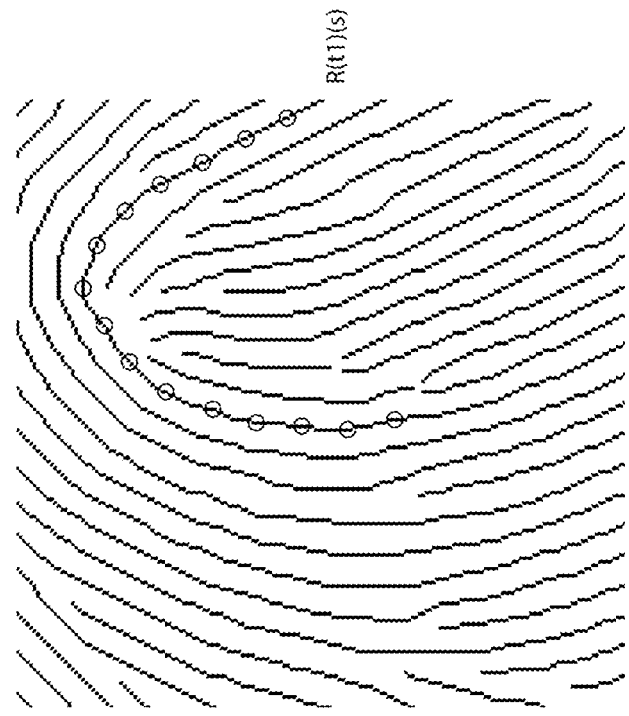
FIG. 14 illustrates different windows onto a curve segment under evaluation.
Figure 14:
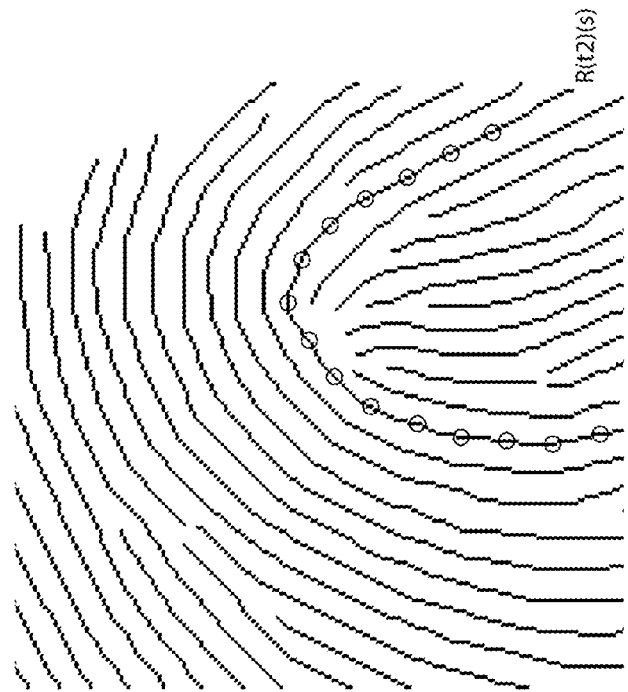

FIG. 14-FIG. 17 illustrate a second phase of a comparison process of some of the embodiments when possible conforming curve segments are found. FIG. 14 illustrates different pattern portions of the same pattern source. One challenge in comparing first curve segment R(t1)(s) against second curve segment R(t2)(s) is that the relative translation between the pattern source and the sensor results in different visible lengths of the same curve segment. Curve segment points on R(t1)(s) are artificially limited to match the available data of the potentially conforming second curve segment R(t2)(s) in preparation of further testing the curve segment data.

Figure 15:
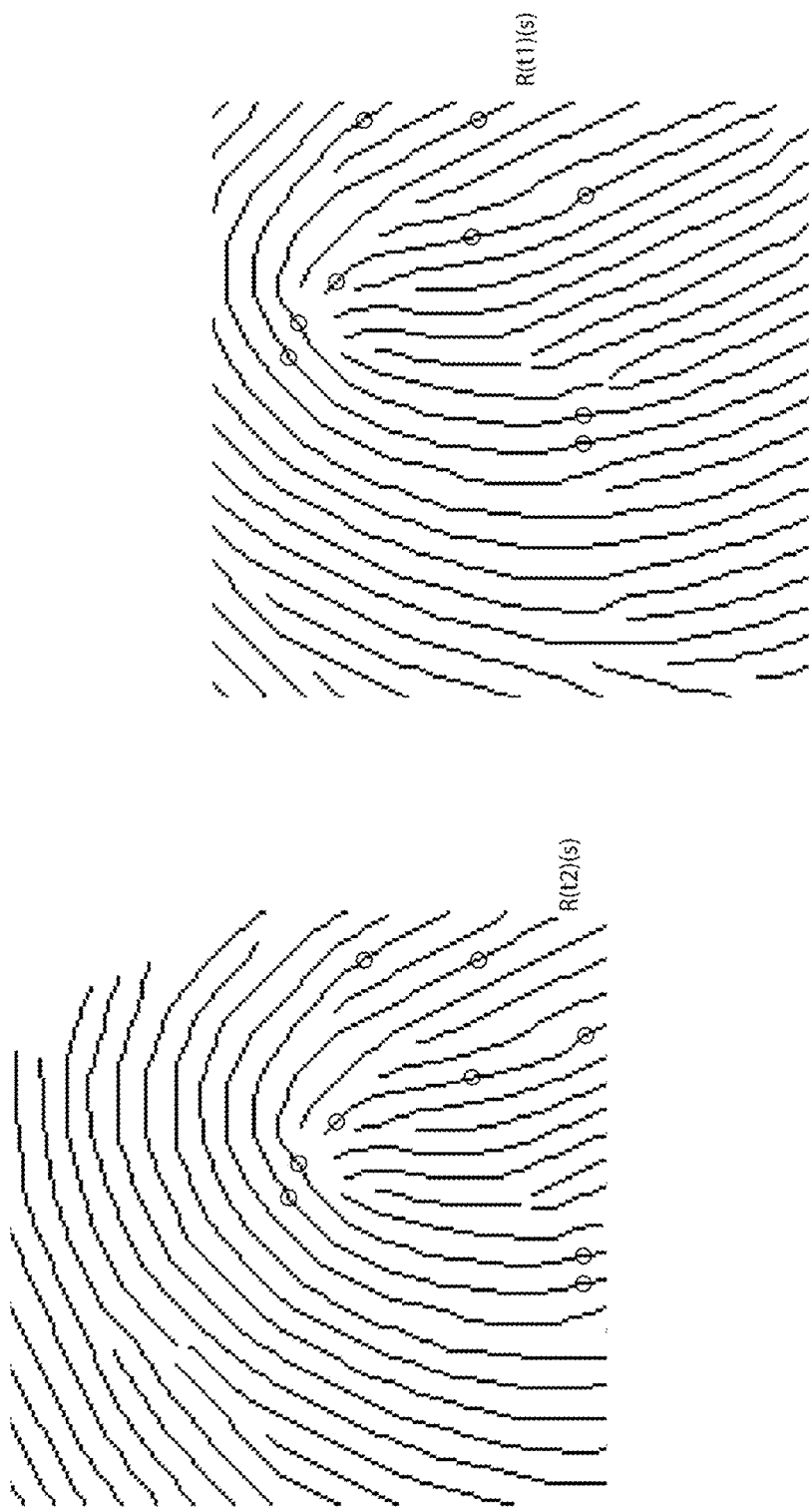
FIG. 15 illustrates definition of corresponding curve points of interest for potentially conforming curve segments in a pair of sets of curve segments.

FIG. 15 illustrates identification of mid points and end points of each curve segment of a cluster of curve segments that are to be further evaluated for a relative positional figure of merit.

Figure 16:
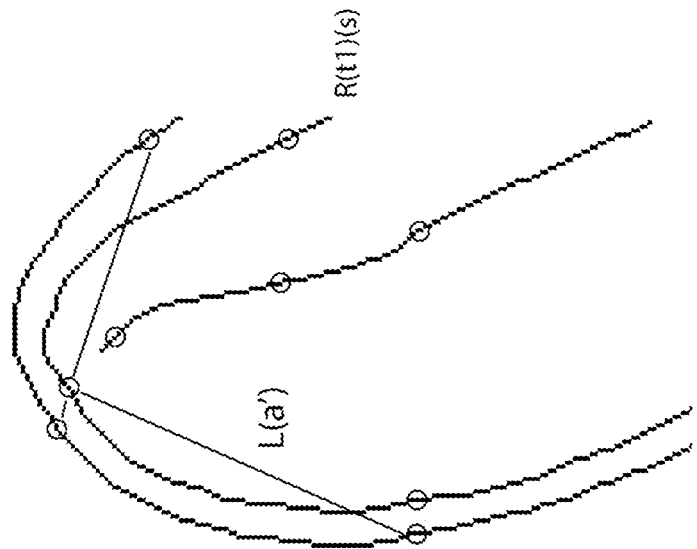
FIG. 16 illustrates an embodiment for a determination of a relative positional figure of merit for candidate conforming curve segments.
Figure 16:
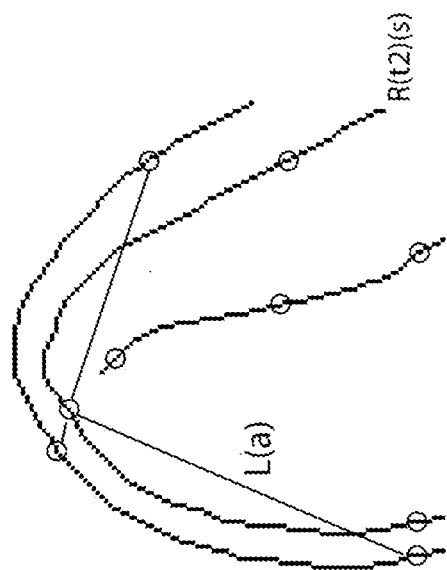
Figure 17:
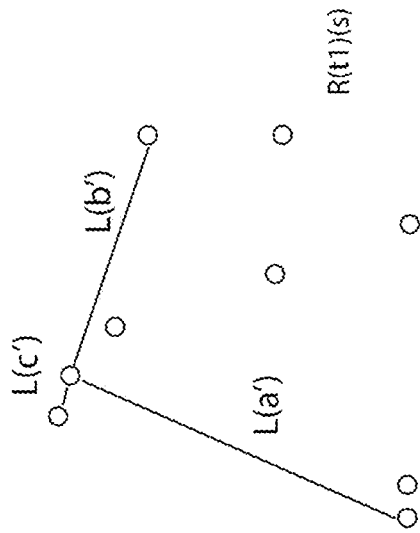
FIG. 17 illustrates an associated quantification of the determination of the relative positional figure of merit for candidate conforming curve segments.
Figure 17:
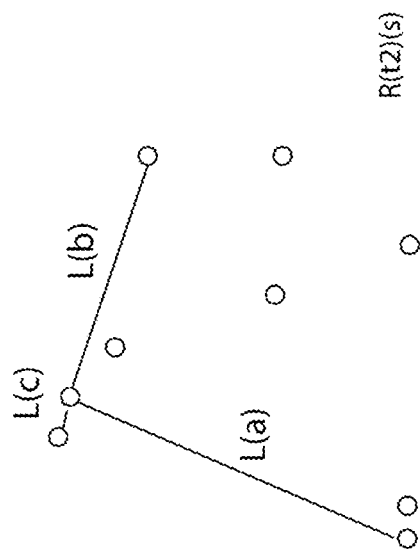

FIG. 16 illustrates an embodiment for a setup for a determination of a relative positional figure of merit for candidate conforming curve segments of a curve segment cluster with FIG. 17 illustrating the resulting constructed line segments. While triangulation is performed for each point on a first curve by determining each length of three line segments extending from the point to the three points on a second curve. The relative positional figure of merit is based upon a deviation of the lengths of the line segments: $L(a) \approx L(a')$ AND $L(b) \approx L(b')$ AND $L(c) \approx L(c')$ for each point on each curve segment of the cluster.

The system and methods above has been described in general terms as an aid to understanding details of preferred embodiments of the present invention. In the description herein, numerous specific details are provided, such as examples of components and/or methods, to provide a thorough understanding of embodiments of the present invention. Some features and benefits of the present invention are realized in such modes and are not required in every case. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims. Thus, the scope of the invention is to be determined solely by the appended claims.

What is claimed as new and desired to be protected by Letters Patent of the United States is:

1. A machine-implemented pattern testing method comparing a first digital representation of a first pattern against a second digital representation of a second pattern to establish a measure of correspondence between the first pattern and the second pattern using a processor executing a set of instructions, comprising:

mapping, using the processor, a first set of characteristic parameters derived from the first digital representation, said first set of characteristic parameters including a first plurality of discrete pattern elements and a first set of relative orientations between combinations of neighboring pattern elements of said first plurality of discrete pattern elements;

deriving, using the processor, a second set of characteristic parameters from the second digital representation, said second set of characteristic parameters including a second plurality of discrete pattern elements and a second set of relative orientations between combinations of neighboring pattern elements of said second plurality of discrete pattern elements;

deriving, using the processor, for each particular discrete pattern element of said first plurality of discrete pattern elements, a set of candidate discrete pattern elements from said second plurality of discrete pattern elements corresponding to said particular discrete pattern element;

establishing, using the processor, a degree of correspondence for each said candidate discrete pattern element; and determining, using the processor, a figure of merit between said sets of characteristic parameters responsive to an analysis of said degrees of correspondence for said sets of candidate discrete patterns.

2. The machine-implemented pattern testing method of claim 1 wherein the patterns include human fingerprints, and wherein said discrete pattern elements include fingerprint ridge structures having one or more curve segments, each said curve segment including a series of adjacent contrast elements.

3. A machine-implemented pattern testing method comparing a first digital representation of a first pattern against a second digital representation of a second pattern to establish a measure of correspondence between the first pattern and the second pattern using a processor executing a set of instructions, comprising:

mapping, using the processor, a first set of characteristic parameters derived from the first digital representation, said first set of characteristic parameters including a first plurality of discrete pattern elements and a first set of relative orientations between combinations of neighboring pattern elements of said first plurality of discrete pattern elements;

mapping, using the processor, a second set of characteristic parameters derived from the second digital representation, said second set of characteristic parameters including a second plurality of discrete pattern elements and a second set of relative orientations between combinations of neighboring pattern elements of said second plurality of discrete pattern elements;

defining, using the processor, for each particular discrete pattern element of said first plurality of discrete pattern elements, a set of candidate discrete pattern elements from said second plurality of discrete pattern elements corresponding to said particular discrete pattern element;

establishing, using the processor, a degree of correspondence for each said candidate discrete pattern element; and determining, using the processor, a figure of merit between said sets of characteristic parameters responsive to an analysis of said degrees of correspondence for said sets of candidate discrete patterns;

wherein mapping said first set of characteristics includes, for each first discrete pattern element of said first plurality of pattern elements:

identifying, using the processor, a first end of said first discrete pattern, a second end of said first discrete pattern, and a first midpoint having a first pattern element half extending from said first midpoint to said first end of said first discrete pattern and a second pattern element half extending from said first midpoint to said second end of said first discrete pattern;

locating, using the processor, a first end node at said first end of said first discrete pattern;

locating, using the processor, a second end node at said second end of said first discrete pattern;

locating, using the processor, a first midpoint node at said first midpoint;

locating, using the processor, a D number of particularly spaced nodes on said first pattern element half;

locating, using the processor, said D number of particularly spaced nodes on second pattern element half; and determining, using the processor, for each first particular node of a first set of said nodes on said pattern element halves of said first discrete pattern, a first predetermined geometric relationship between said first particular node and a first plurality of combinations of said nodes from said first set of nodes, each said first combination from said first set of nodes including a first combination node spaced away from said first particular node on said first discrete pattern toward said first end of said first discrete pattern and a second combination node spaced away from said first particular node on said first discrete pattern towards said second end of said first discrete pattern producing a first set of predetermined relationships for said first set of nodes.

4. The machine-implemented pattern testing method of claim 3 wherein mapping said second set of characteristics includes, for each second discrete pattern element of said second plurality of pattern elements:

identifying, using the processor, a third end of said second discrete pattern, a fourth end of said second discrete pattern, and a second midpoint having a third pattern element half extending from said second midpoint to said third end of said second discrete pattern and a fourth pattern element half extending from said second midpoint to said fourth end of said second discrete pattern;

locating, using the processor, a third end node at said third end of said second discrete pattern;

locating, using the processor, a fourth end node at said fourth end of said second discrete pattern;

locating, using the processor, a second midpoint node at said second midpoint;

locating, using the processor, a D' number of particularly spaced nodes on said third pattern element half;

locating, using the processor, said D' number of particularly spaced nodes on fourth pattern element half; and determining, using the processor, for each second particular node of a second set of said nodes on said pattern element halves of said second discrete pattern, a second predetermined geometric relationship between said second particular node and a second plurality of combinations of said nodes from said second set of nodes, each said second combination from said second set of nodes including a third combination node spaced away from said second particular node on said second discrete pattern toward said third end of said second discrete pattern and a fourth combination node spaced away from said second particular node on said second discrete pattern towards said fourth end of said first discrete pattern producing a second set of predetermined relationships for said second set of nodes.

5. The machine-implemented pattern testing method of claim 4 wherein said particularly spaced nodes include uniformly spaced nodes.

6. A machine-implemented pattern testing method comparing a first digital representation of a first pattern against a second digital representation of a second pattern to establish a measure of correspondence between the first pattern and the second pattern using a processor executing a set of instructions, comprising:

mapping, using the processor, a first set of characteristic parameters derived from the first digital representation, said first set of characteristic parameters including a first plurality of discrete pattern elements and a first set of relative orientations between combinations of neighboring pattern elements of said first plurality of discrete pattern elements;

mapping, using the processor, a second set of characteristic parameters derived from the second digital representation, said second set of characteristic parameters including a second plurality of discrete pattern elements and a second set of relative orientations between combinations of neighboring pattern elements of said second plurality of discrete pattern elements;

defining, using the processor, for each particular discrete pattern element of said first plurality of discrete pattern elements, a set of candidate discrete pattern elements from said second plurality of discrete pattern elements corresponding to said particular discrete pattern element;

establishing, using the processor, a degree of correspondence for each said candidate discrete pattern element; and determining, using the processor, a figure of merit between said sets of characteristic parameters responsive to an analysis of said degrees of correspondence for said sets of candidate discrete patterns;

wherein determining said figure of merit includes determining, using the processor, a set of figures of merit including a figure of merit for each pattern element of said first set of discrete pattern elements versus each pattern element of said second set of discrete pattern elements, further comprising identifying, using the processor, responsive to said set of figures of merit, a first candidate discrete pattern element from said first set of discrete pattern elements; and identifying, using the processor, responsive to said set of figures of merit, a second candidate discrete pattern element from said second set of discrete pattern elements that corresponds closely to said first candidate discrete pattern.

7. The machine-implemented pattern testing method of claim 6 further comprising:

identifying, using the processor, responsive to said set of figures of merit, a third candidate discrete pattern element from said first set of discrete pattern elements, said third candidate discrete pattern element a first spatially proximate neighboring discrete pattern element relative to said first candidate discrete pattern element; and identifying, using the processor, responsive to said set of figures of merit, a fourth candidate discrete pattern element from said second set of discrete pattern elements, said fourth candidate discrete pattern element a second spatially proximate neighboring discrete pattern element relative to said second candidate discrete pattern element;

determining, using the processor, a first metric representative of a first spatial correspondence between said first candidate discrete pattern element and said third candidate discrete pattern element; and determining, using the processor, a second metric representative of a second spatial correspondence between said second candidate discrete pattern element and said fourth candidate discrete pattern element; and wherein said determining a figure of merit between said sets of characteristic parameters is further responsive to an evaluation of said metrics.

8. A machine-implemented pattern testing method comparing a first digital representation of a first fingerprint under test against a second digital representation of a second fingerprint under test to establish a measure of correspondence between the fingerprints, under test, comprising:

identifying a first set of curve elements in the first digital representation, said first set of curve elements including a first plurality of curve segments derived from the first fingerprint;

identifying a second set of curve elements in the second digital representation, said second set of curve elements including a second plurality of curve segments derived from the second fingerprint;

producing a first set of geometric signatures for the first plurality of curve segments;

producing a second set of geometric signatures for the second plurality of curve segments; and producing a figure of merit of correspondence between the digital representations by evaluating said sets of geometric signatures against each other.

9. The machine-implemented pattern testing method of claim 8 wherein said first set of geometric signatures include, for each particular curve element of a first subset of said first set of curve elements, a first plurality of angles defined by different ordered combinations of three points on said particular curve element, wherein said second set of geometric signatures include, for each particular curve element of a second subset of said second set of curve elements, a second plurality of angles defined by different ordered combinations of three points on said particular curve element, and wherein said figure of merit of correspondence is directly related to a degree of correspondence between said first plurality of angles and said second plurality of angles.

10. The machine-implemented pattern testing method of claim 9 wherein said first set of geometric signatures includes a first particular curve element and a first neighboring curve element having a first measured geometric relationship to said first particular curve element, wherein said second set of geometric signatures includes a second particular curve element and a second neighboring curve element having a second measured geometric relationship to said second particular curve element, further comprising:

evaluating a correspondence between a plurality of pairs of said particular curve elements from different sets of said sets of curve elements;

evaluating a correspondence between a plurality of pairs of said neighboring curve elements from different sets of said sets of curve elements; and evaluating a correspondence between a plurality of pairs of said measured geometric relationships from different sets of said sets of curve elements;

wherein said figure of merit correspondence is responsive to said correspondences.

11. The machine-implemented pattern testing method of claim 10 wherein each first particular curve element of said first set of curve elements includes a first midpoint, a first end, a first half curve segment extending from said first midpoint to said first end, a second end, a second half curve segment extending from said first midpoint to said second end, a first midpoint node located at said first midpoint, a D number of evenly spaced nodes established on each half segment of each said first particular curve element of said first set of curve elements, and a first matrix of angles, said first matrix of angles including a first set of angles for each first particular node of said first particular curve element of said first set of curve elements with each said angle of each said first particular node having said first particular node as a first vertex and a first pair of legs extending from said first vertex with each leg of said first pair of legs extending to a different $M^{th}$-spaced node from said first vertex on said particular curve element, M greater than or equal to 1 and M less than or equal to D, wherein each second particular curve element of said second set of curve elements includes a second midpoint, a third end, a third half curve segment extending from said second midpoint to said third end, a fourth end, a fourth half curve segment extending from said second midpoint to said fourth end, a second midpoint node located at said second midpoint, a D' number of evenly spaced nodes established on each half segment of each said second particular curve element of said second set of curve elements, and a second matrix of angles, said second matrix of angles including a second set of angles for each second particular node of said second particular curve element of said first set of curve elements with each said angle of each said second particular node having said second particular node as a second vertex and a second pair of legs extending from each said second vertex with each leg of said second pair of legs extending to a different $P^{th}$-spaced node from said second vertex on said particular curve element, P greater than or equal to 1 and P less than or equal to D';

wherein said correspondence between said particular curve elements from different ones of said curve sets includes an evaluation of correspondences between said sets of angles from said curve segments from different sets of curve segments.

12. A machine-implemented method for comparing a first digital representation of a first pattern source against a second digital representation of a second pattern source, the first digital representation including a first set of curves having an N number of curve segments and the second digital representation including a second set of curve having an N' number of curve segments using a processor executing a set of instructions, comprising:

mapping, using the processor, the N number of curve segments as a first set of N number of machine-readable curve segments;

mapping, using the processor, the N' number of curve segments as a second set of N' number of machine-readable curve segments;

identifying, for each first particular curve segment of said first set of machine-readable curve segments using the processor, a first pair of associated machine-readable curve segment endpoints with each said first particular curve segment extending between said first pair of associated machine-readable curve segment endpoints;

identifying, for each second particular curve segment of said second set of machine-readable curve segments using the processor, a second pair of associated machine-readable curve segment endpoints with each said second particular curve segment extending between said second pair of associated machine-readable curve segment endpoints;

dividing, using the processor, each said machine-readable curve segment of said first set of N number of machine-readable curve segments into a 2*D number of machine-readable curve segment portions, each said 2*D number of machine-readable curve segment portions of equal length with a segment junction between each adjacent pair of said 2*D number of machine-readable curve segment portions;

dividing, using the processor, each said machine-readable curve segment of said second set of N' number of machine-readable curve segments into a 2*D' number of machine-readable curve segment portions, each said 2*D' number of machine-readable curve segment portions of equal length with a segment junction between each adjacent pair of said 2*D' number of machine-readable curve segment portions;

establishing, using the processor, a node at each said segment junction; and calculating, using the processor, a first matrix $M_{i,j}$ of curvature angular data for the first set of curves, one$\leq$i$\leq$N and one$\leq$j$\leq$D, said first matrix $M_{i,j}$ defining a first angle $A_{i,j}$ for a first particular node of said $i^{th}$ machine-readable curve segment of said first set of curves with said first particular node defining a first vertex, a first leg of said first angle $A_{i,j}$ extending from said first vertex to a first leg node spaced j number of segment junctions from said first particular node, and a second leg of said first angle $A_{i,j}$ extending from said first vertex to a second leg node spaced –j number of segment junctions from said first particular node;

calculating, using the processor, a second matrix $M'_{s,t}$ of curvature angular data for the second set of curves, one$\leq$s$\leq$N' and one$\leq$t$\leq$D', said second matrix $M'_{s,t}$ defining a second angle $A_{s,t}$ for a second particular node of said $s^{th}$ machine-readable curve segment of said second set of curves with said second particular node as a second vertex, a first leg of said second angle $A_{s,t}$ extending from said second vertex to a third leg node spaced t number of segment junctions from said second particular node, and a second leg of said second angle $A_{s,t}$ extending from said second vertex to a fourth leg node spaced –t number of segment junctions from said second particular node; and comparing using the processor, said first matrix M with said second matrix M' to create a plurality of correspondence metrics, each said correspondence metric measuring a degree of correspondence between a first set of candidate curve segments of said first set of curves and each curve segment of a second set of candidate curve segments of said second set of curves.

13. The comparing method of claim 12 further comprising:

establishing, using the processor, a first pattern signature between a first subset of curve segments of said first set of candidate curve segments;

establishing, using the processor, a second pattern signature between a second subset of curve segments of said second set of candidate curve segments, said second subset of curve segments corresponding to said first subset of curve segments responsive to said measured degree of correspondence; and establishing, using the processor, the second digital representation as a possible match to the first digital representation when a comparison of said pattern signatures is within a predetermined threshold.

14. The comparing method of claim 13 further comprising:

identifying, using the processor, said candidate curve segments to a matcher process for a match determination when said comparison of said pattern signatures is within said predetermined threshold; and skipping, using the processor, said matcher process for said match determination when said comparison of said pattern signatures is not within said predetermined threshold.

15. An apparatus for comparing a first digital representation of a first pattern source against a second digital representation of a second pattern source, the first digital representation including a first set of curves having an N number of curve segments and the second digital representation including a second set of curve having an N' number of curve segments, comprising:

a pattern collector producing one or more of the digital representations; and a processing system, coupled to said pattern collector, including a processor and a memory coupled to said processor, said memory storing a plurality of computer executable instructions wherein said processor executes said plurality of computer executable instructions to perform a method, comprising:

mapping the N number of curve segments as a first set of N number of machine-readable curve segments;

mapping the N' number of curve segments as a second set of N' number of machine-readable curve segments;

identifying, for each first particular curve segment of said first set of machine-readable curve segments, a first pair of associated machine-readable curve segment endpoints with each said first particular curve segment extending between said first pair of associated machine-readable curve segment endpoints;

identifying, for each second particular curve segment of said second set of machine-readable curve segments, a second pair of associated machine-readable curve segment endpoints with each said second particular curve segment extending between said second pair of associated machine-readable curve segment endpoints;

dividing each said machine-readable curve segment of said first set of N number of machine-readable curve segments into a 2*D number of machine-readable curve segment portions, each said 2*D number of machine-readable curve segment portions of equal length with a segment junction between each adjacent pair of said 2*D number of machine-readable curve segment portions;

dividing each said machine-readable curve segment of said second set of N' number of machine-readable curve segments into a 2*D' number of machine-readable curve segment portions, each said 2*D' number of machine-readable curve segment portions of equal length with a segment junction between each adjacent pair of said 2*D' number of machine-readable curve segment portions;

establishing a node at each said segment junction; and calculating a first matrix $M_{i,j}$ of curvature angular data for the first set of curves, one≤i≤N and one≤j≤D, said first matrix $M_{i,j}$ defining a first angle $A_{i,j}$ for a first particular node of said $i^{th}$ machine-readable curve segment of said first set of curves with said first particular node defining a first vertex, a first leg of said first angle $A_{i,j}$ extending from said first vertex to a first leg node spaced j number of segment junctions from said first particular node, and a second leg of said first angle $A_{i,j}$ extending from said first vertex to a second leg node spaced number of segment junctions from said first particular node;

calculating a second matrix $M'_{s,t}$ of curvature angular data for the second set of curves, one≤s≤N' and one≤t≤D', said second matrix $M'_{s,t}$ defining a second angle $A_{s,t}$ for a second particular node of said $s^{th}$ machine-readable curve segment of said second set of curves with said second particular node as a second vertex, a first leg of said second angle $A_{s,t}$ extending from second vertex to a third leg node spaced t number of segment junctions from said second particular node, and a second leg of said second angle $A_{s,t}$ extending from said second vertex to a fourth leg node spaced −t number of segment junctions from said second particular node; and comparing said first matrix M with said second matrix M' to create a plurality of correspondence metrics, each said correspondence metric measuring a degree of correspondence between a first set of candidate curve segments of said first set of curves and each curve segment of a second set of candidate curve segments of said second set of curves.

16. The apparatus of claim 15 further comprising:

establishing a first pattern signature between a first subset of curve segments of said first set of candidate curve segments;

establishing a second pattern signature between a second subset of curve segments of said second set of candidate curve segments, said second subset of curve segments corresponding to said first subset of curve segments responsive to said measured degree of correspondence; and establishing the second digital representation as a possible match to the first digital representation when a comparison of said pattern signatures is within a predetermined threshold.

17. The apparatus of claim 16 further comprising:

identifying said candidate curve segments to a matcher process for a match determination when said comparison of said pattern signatures is within said predetermined threshold; and skipping said matcher process for said match determination when said comparison of said pattern signatures is not within said predetermined threshold.

18. A non-transitory computer readable medium with computer executable instructions stored thereon executed by a processor to perform the method of comparing a first digital representation of a first pattern source against a second digital representation of a second pattern source, the first digital representation including a first set of curves having an N number of curve segments and the second digital representation including a second set of curve having an N' number of curve segments, the method comprising:

mapping the N number of curve segments as a first set of N number of machine-readable curve segments;

mapping the N' number of curve segments as a second set of N' number of machine-readable curve segments;

identifying, for each first particular curve segment of said first set of machine-readable curve segments, a first pair of associated machine-readable curve segment endpoints with each said first particular curve segment extending between said first pair of associated machine-readable curve segment endpoints;

identifying, for each second particular curve segment of said second set of machine-readable curve segments, a second pair of associated machine-readable curve segment endpoints with each said second particular curve segment extending between said second pair of associated machine-readable curve segment endpoints;

dividing each said machine-readable curve segment of said first set of N number of machine-readable curve segments into a 2*D number of machine-readable curve segment portions, each said 2*D number of machine-readable curve segment portions of equal length with a segment junction between each adjacent pair of said 2*D number of machine-readable curve segment portions;

dividing each said machine-readable curve segment of said second set of N' number of machine-readable curve segments into a 2*D' number of machine-readable curve segment portions, each said 2*D' number of machine-readable curve segment portions of equal length with a segment junction between each adjacent pair of said 2*D' number of machine-readable curve segment portions;

establishing a node at each said segment junction; and calculating a first matrix $M_{i,j}$ of curvature angular data for the first set of curves, one≤i≤N and one≤j≤D, said first matrix $M_{i,j}$ defining a first angle $A_{i,j}$ for a first particular node of said $i^{th}$ machine-readable curve segment of said first set of curves with said first particular node defining a first vertex, a first leg of said first angle $A_{i,j}$ extending from said first vertex to a first leg node spaced j number of segment junctions from said first particular node, and a second leg of said first angle $A_{i,j}$ extending from said first vertex to a second leg node spaced −j number of segment junctions from said first particular node;

calculating a second matrix $M'_{s,t}$ of curvature angular data for the second set of curves, one≤s≤N' and one≤t≤D', said second matrix $M'_{s,t}$ defining a second angle $A_{s,t}$ for a second particular node of said $s^{th}$ machine-readable curve segment of said second set of curves with said second particular node as a second vertex, a first leg of said second angle $A_{s,t}$ extending from said second vertex to a third leg node spaced t number of segment junctions from said second particular node, and a second leg of said second angle $A_{s,t}$ extending from said second vertex to a fourth leg node spaced −t number of segment junctions from said second particular node; and comparing said first matrix M with said second matrix M' to create a plurality of correspondence metrics, each said correspondence metric measuring a degree of correspondence between a first set of candidate curve segments of said first set of curves and each curve segment of a second set of candidate curve segments of said second set of curves.

19. The non-transitory computer readable medium of claim 18 further comprising:

establishing a first pattern signature between a first subset of curve segments of said first set of candidate curve segments;

establishing a second pattern signature between a second subset of curve segments of said second set of candidate curve segments, said second subset of curve segments corresponding to said first subset of curve segments responsive to said measured degree of correspondence; and establishing the second digital representation as a possible match to the first digital representation when a comparison of said pattern signatures is within a predetermined threshold.

20. The non-transitory computer readable medium of claim 19 further comprising:

identifying said candidate curve segments to a matcher process for a match determination when said comparison of said pattern signatures is within said predetermined threshold; and skipping said matcher process for said match determination when said comparison of said pattern signatures is not within said predetermined threshold.

21. A machine-implemented method of evaluating an unknown set of curves from a first digital representation against an authorized set of curves from a second digital representation using a processor executing a set of instructions, comprising:

identifying, using the processor, a first set of curve segments from the unknown set of curves, each said curve segment extending from a first curve segment start to a first curve segment end;

identifying, using the processor, a second set of curve segments from the authorized set of curves, each said curve segment extending from a second curve segment start to a second curve segment end;

comparing, using the processor implementing a nested method comparison, each particular curve segment of said first set of curve segments against each said curve segment of said second set of curve segments, each said comparison establishing a figure of merit for a conformation of said particular curve segments to each other; and matching, in a decreasing order of conformation responsive to said associated figures of merit and using the processor, said curve segments of said first set of curve segments to said second set of curve segments to produce, for each particular curve segment of said first set of curve segments a ranked set of candidate conforming curve segments from said second set of curve segments.

22. The evaluating method of claim 21 further comprising:

clustering, using the processor, a first group of said curve segments of said first set of curves, each said curve segment of said first group having an associated curve segment in said, said first group of curve segments establishing a first pattern signature;

clustering, using the processor, a second group of curve segments of said ranked set of candidate conforming curve segments;

establishing, using the processor, a second pattern signature for said second group of curve segments; and comparing, using the processor, said clusters and comparing said pattern signatures to establish a conformance of the first digital representation with the second digital representation.

* * * * *